US008045200B2

(12) United States Patent
Yamasaki et al.

(10) Patent No.: US 8,045,200 B2
(45) Date of Patent: Oct. 25, 2011

(54) IMAGE PROCESSOR WITH COMMUNICATION UNITS FOR PROCESSING DIFFERENT JOB TYPES ACCORDING TO PRIORITY

(75) Inventors: Shinichi Yamasaki, Nara (JP); Atsushi Kurimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1260 days.

(21) Appl. No.: 11/717,906

(22) Filed: Mar. 13, 2007

(65) Prior Publication Data

US 2007/0285709 A1   Dec. 13, 2007

(30) Foreign Application Priority Data

Apr. 6, 2006   (JP) ................................. 2006-104786

(51) Int. Cl.
*G06F 3/12* (2006.01)
(52) U.S. Cl. ..................... 358/1.15; 358/1.14; 358/1.16; 358/1.13
(58) Field of Classification Search .................. None
See application file for complete search history.

(56) References Cited

U.S. PATENT DOCUMENTS

| | | | | |
|---|---|---|---|---|
| 5,018,079 A * | 5/1991 | Shukunami et al. | ........... | 358/1.6 |
| 5,668,936 A * | 9/1997 | Motooka et al. | ............. | 358/1.15 |
| 5,774,356 A * | 6/1998 | Hisatake et al. | ................ | 700/28 |
| 5,920,405 A * | 7/1999 | McIntyre et al. | ............. | 358/442 |
| 5,930,462 A * | 7/1999 | Iwasaki et al. | ............... | 358/1.14 |
| 5,970,224 A * | 10/1999 | Salgado et al. | .............. | 358/1.16 |
| 6,327,248 B1 * | 12/2001 | Hosokawa et al. | ........... | 370/235 |
| 6,621,589 B1 * | 9/2003 | Al-Kazily et al. | ........... | 358/1.15 |
| 6,724,495 B1 * | 4/2004 | Morisaki | ....................... | 358/1.15 |
| 6,940,616 B1 * | 9/2005 | Irisa | .............................. | 358/1.15 |
| 7,180,637 B2 * | 2/2007 | Tanimoto | ....................... | 358/402 |
| 7,216,347 B1 * | 5/2007 | Harrison et al. | .............. | 718/103 |
| 7,564,584 B2 * | 7/2009 | Takahashi et al. | ............. | 358/2.1 |
| 2002/0039195 A1 * | 4/2002 | Miyake | ......................... | 358/1.15 |
| 2005/0012770 A1 * | 1/2005 | Endo | .............................. | 347/19 |
| 2005/0128513 A1 * | 6/2005 | Cho | ............................... | 358/1.15 |
| 2005/0213149 A1 * | 9/2005 | Kuwahara | .................... | 358/1.15 |
| 2006/0218272 A1 * | 9/2006 | Murakami | .................... | 709/224 |
| 2006/0221391 A1 * | 10/2006 | Okazawa et al. | ............ | 358/1.15 |

FOREIGN PATENT DOCUMENTS

| | | | |
|---|---|---|---|
| JP | 05-136918 | | 6/1993 |
| JP | 07-200206 | | 8/1995 |
| JP | 09-286154 | | 11/1997 |
| JP | 09286154 A | * | 11/1997 |
| JP | 2004-221723 | | 8/2004 |
| JP | 2005186425 A | * | 7/2005 |

* cited by examiner

*Primary Examiner* — King Poon
*Assistant Examiner* — Dung Tran
(74) *Attorney, Agent, or Firm* — David G. Conlin; Steven M. Jensen; Edwards Angell Palmer & Dodge LLP

(57) ABSTRACT

An image processor has a plurality of NICs (communication units), and a function of executing a plurality of jobs involving communication processes with terminals through the NICs. The job processing efficiency of the image processor is improved to the utmost extent. The types of priority jobs are preset for each of the NICs in priority job setting data, and the image processor carries out control so that a type of a job set to be given priority in the priority job setting data is processed in priority when a plurality of jobs involving communication processes through the NICs arise at overlapping timing. A job transmitter terminal transmits a job to the address of the NIC corresponding to the type of the job on the basis of the data that presets the corresponding relation between the types of jobs and communication addresses.

6 Claims, 13 Drawing Sheets

FIG. 4

PRIORITY LEVEL TABLE — D11

|  | PRIORITY LEVEL IS "1" | PRIORITY LEVEL IS "2" | PRIORITY LEVEL IS "3" |
|---|---|---|---|
| FIRST NIC | PRINT | DATA FILING | SCAN |
| SECOND NIC | SCAN | PRINT | DATA FILING |
| THIRD NIC | DATA FILING | SCAN | PRINT |

FIG. 5

JOB TYPE/SUBPOWER SUPPLY LINK TABLE — D12

| JOB TYPE | SC | PR | DF | MPR |
|---|---|---|---|---|
| FIRST SUBPOWER SOURCE | ON | ON | ON | ON |
| SECOND SUBPOWER SOURCE | ON | — | — | — |
| THIRD SUBPOWER SOURCE | — | ON | — | — |
| FOURTH SUBPOWER SOURCE | — | — | — | — |

FIG. 6A

JOB/ADDRESS LINKING DATA
(FIRST EXAMPLE)

D21

| JOB TYPE | ADDRESS OF THE TRANSMISSION DESTINATION OF THE JOB |
|---|---|
| PRINT | ADDRESS OF THE FIRST NIC |
| SCAN | ADDRESS OF THE SECOND NIC |
| DATA FILING | ADDRESS OF THE THIRD NIC |

FIG. 6B

JOB/ADDRESS LINKING DATA
(SECOND EXAMPLE)

| JOB TYPE | ADDRESS OF THE TRANSMISSION DESTINATION OF THE JOB |
|---|---|
| PRINT | ADDRESS OF THE THIRD NIC |
| SCAN | ADDRESS OF THE SECOND NIC |
| DATA FILING | ADDRESS OF THE FIRST NIC |

FIG.12A

JOB/ADDRESS LINKING DATA  D31

| JOB TYPE | TRANSMISSION DESTINATION OF THE JOB |
|---|---|
| PRINT | ADDRESS OF THE FIRST NIC |
| SCAN | ADDRESS OF THE SECOND NIC |
| DATA FILING | ADDRESS OF THE THIRD NIC |

FIG.12B

ABNORMALITY PRESENCE/ABSENCE DATA  D32

| | ABNORMALITY PRESENCE/ABSENCE |
|---|---|
| PRINT | ABSENCE |
| SCAN | PRESENCE |
| DATA FILING | ABSENCE |

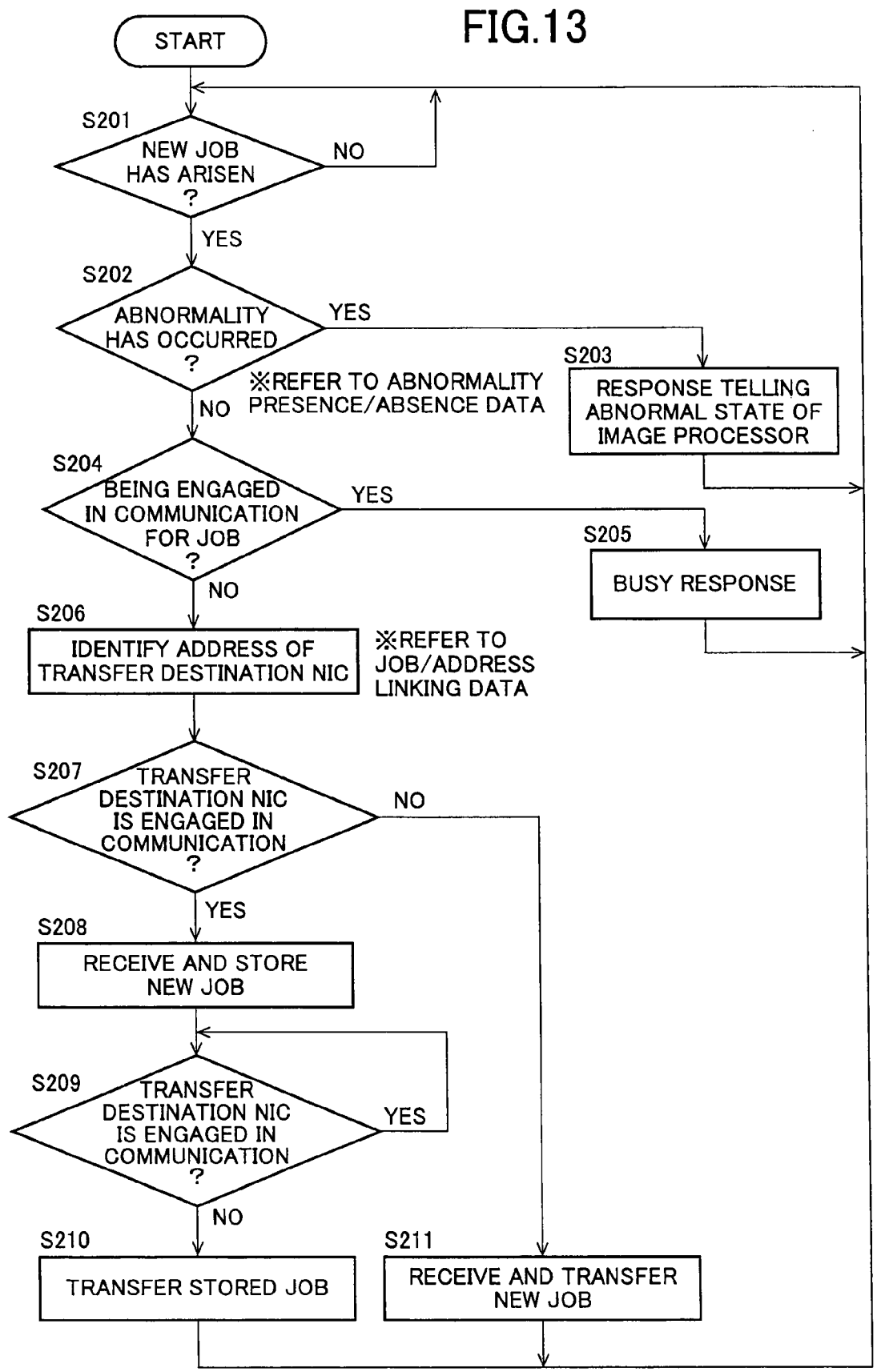

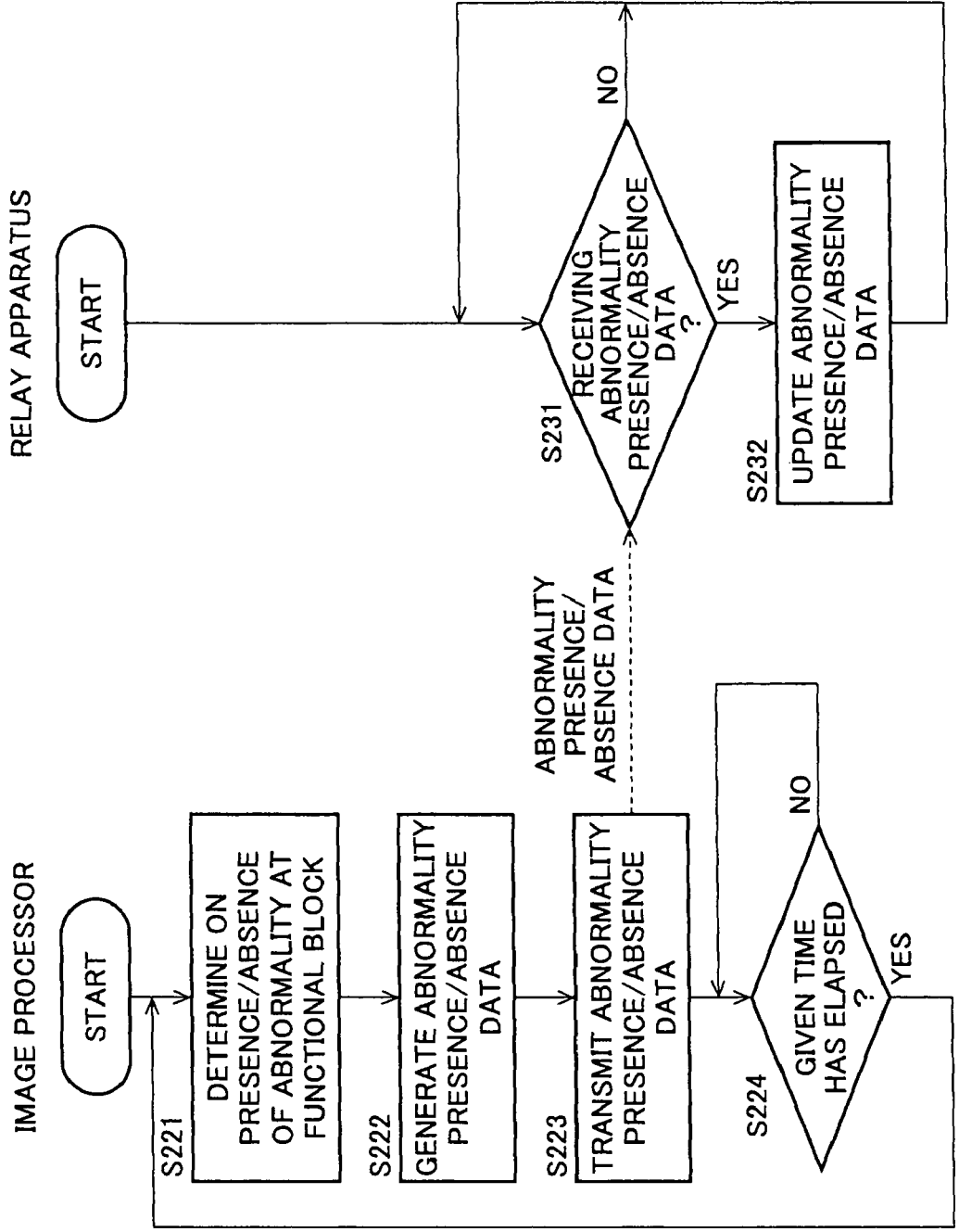

IMAGE PROCESSOR WITH COMMUNICATION UNITS FOR PROCESSING DIFFERENT JOB TYPES ACCORDING TO PRIORITY

CROSS-NOTING PARAGRAPH

This Non-provisional application claims priority under 35 U.S.C. §119 (a) on Patent Application No. 2006-104786 filed in JAPAN on Apr. 6, 2006, the entire contents of which are hereby incorporated herein by reference.

FIELD OF THE INVENTION

The present invention relates to an image processor having a plurality of communication units that communicate with external devices, an image processing system including the image processor as a constituent, a job transmission program that is executed by a computer capable of communicating with the image processor, and a job type/address linking data automatic setting program that is executed by the computer.

BACKGROUND OF THE INVENTION

Generally, an image processor, such as a printer, scanner, fax machine, copier, and complex machine combining the functions of those apparatuses, has a communication unit (NIC (Network Interface Card), modem (modulator-demodulator), etc.) that communicates with an external device (computer, another image processor, etc.) via such a communication medium as network and telephone circuit. Some image processors have a plurality of communication units. In many cases, such an image processor works as so-called complex machine that has a function of executing a plurality of types of jobs involving communication processes with external devices through the communication units.

The image processor has, for example, a print function of receiving a print job from an external terminal (personal computer, etc.) through an NIC and printing out based on the print job.

The image processor has other functions, such as a scan data transmission function of transmitting image data read from a manuscript by a scanner of the image processor to another terminal through an NIC.

The image processor having a plurality of communication units is capable of executing a plurality of processes involving communication through the communication units in parallel processing.

For example, an image processor having two NICs (called a first NIC and a second NIC) is assumed. Such an image processor can execute a process involving the print function, using the first NIC, and, in parallel processing, execute a process involving the scan data transmission function (hereinafter "scan job"), using the second NIC.

Conventionally, in an image processing system including an image processor having a plurality of NICs, and terminals capable of communicating with the image processor through the NICs, the communication address (IP address, etc.) of an NIC that is a job transmission destination is preset (stored) at each terminal, so that each terminal is fixed in communication to a specific NIC. In other words, the corresponding relation between the communication units of the image processor and the terminals is fixed in the image processing system.

Japanese Laid-Open Patent Publication No. 2004-221723 discloses a technique that an image processor having a plurality of NICs sends a message to a host computer through a communication unit (NIC) that is determined to be available in sending the message to the host computer.

Regarding an image processing system including an image processor having a plurality of communication units, and terminals capable of communicating with the image processor through the communication units, however, when the corresponding relation between the communication units of the image processor and the terminals is fixed, the system poses a problem of lower job processing efficiency as described below.

When a plurality of terminals send process requests for a plurality of different types of jobs at overlapping timing to the same communication unit of the image processor, the image processor manages to execute only one of the requested jobs even if the jobs can be processed concurrently in parallel processing (e.g., print job and scan job), because the communication unit has to work on overlapping jobs. As a result, the jobs supposed to be processed concurrently in parallel processing cannot be processed concurrently, which leads to lower job processing efficiency.

On the other hand, when a plurality of terminals send process requests for the same kind of jobs at overlapping timing to different communication units of the image processor, no communication unit has to work on overlapping jobs, but the equipment other than communication units that processes the jobs (equipment composing a printing unit carrying out image formation, equipment composing a scanner unit carrying out scanning of manuscript image, etc.) has to work on overlapping jobs. The image processor, therefore, manages to execute only one of the requested jobs. In this case, a job standing by for execution may occupy a communication unit to make impossible the reception of another job that can be processed using the communication unit. As a result, the jobs supposed to be processed concurrently in parallel processing cannot be processed concurrently, which leads to lower job processing efficiency.

SUMMARY OF THE INVENTION

The object of the present invention is to provide an image processor, an image processing system, a job transmission program, and a job type/address linking data automatic setting program that substantially improve job processing efficiency in providing an image processor having a plurality of communication units and a function of executing a plurality of jobs involving communication processes with external devices through the communication units.

A first invention for achieving the above object is an image processor having a plurality of communication units (typically NICs) and a function of executing a plurality of jobs involving communication processes with external devices through the communication units. This image processor includes the following constituents described in (1-1) and (1-2).

(1-1) Priority job setting data obtaining unit that obtains priority job setting data, which sets the types of priority jobs for each of the communication units, from a memory unit storing the priority job setting data.

(1-2) Priority job controlling unit that carries out control so that a type of a job set to be given priority in the priority job setting data is processed in priority when a plurality of jobs involving communication processes through the communication units arise at overlapping timing.

In this case, the priority job setting data is first job priority level setting data that sets the priority levels of a plurality of types of jobs for each of the communication units. The priority job controlling unit carries out control so that a type of a job set to be given a high priority level in the first job priority level setting data is processed in priority.

The memory unit storing the priority job setting data may be incorporated into the image processor or into a device outside the image processor.

The image processor according to the first invention processes in priority the types of jobs that are preset for each communication unit. This image processor operates effectively when a job transmitter terminal (external device) has a function of transmitting a job to the address of the transmission destination corresponding to the type of the job (in this case, address of a communication unit of the image processor) on the basis of data indicating the corresponding relation between the type of jobs and communication addresses (equivalent to third job type/address linking data, which will be described later). This is explained by the following reason.

If the contents of the job type/address linking data, which is referred to by a plurality of terminals, are set to the contents in line with the corresponding relation indicated in the priority job setting data (corresponding relation between the type of priority jobs and communication units), a job transmitted from each terminal to the image processor is processed in priority unless the same type of job as the transmitted job is on execution. For this reason, a user is encouraged to set the contents of the job type/address linking data referred to by each terminal to the contents in line with the priority job setting data.

Based on the priority job setting data, each terminal may automatically set the contents of the job type/address linking data referred to by the terminal to the contents corresponding to that of the priority job setting data.

When the contents of the job type/address linking data referred to by each terminal is set to the contents corresponding to that of the priority job setting data, the arising of different types of jobs at the same communication unit of the image processor at overlapping timing can be avoided. This allows the prevention of such an inefficient situation where only one job is executed when a plurality of jobs that can be processed concurrently in parallel processing (e.g., print job and scan job) arise because a communication unit has to work on overlapping jobs.

Likewise, the arising of the same type of jobs at different communication units of the image processor at overlapping timing can also be avoided. This allows the prevention of such an inefficient situation as described above where a job standing by for execution occupies a communication unit to make impossible the reception of another job that can be processed using the occupied communication unit.

As a result, the image processor prevents an inefficient situation where a plurality of jobs supposed to be processed concurrently in parallel processing cannot be processed concurrently, thus improves the image processor's job processing efficiency.

The image processor according to the first invention may further include either or both of the following constituents described in (1-3) and (1-4).

(1-3) First job type/address linking data transmitting unit that transmits first job type/address linking data to an external device via a communication unit, the first job type/address linking data representing the corresponding relation between the type of each job set to be given priority by each communication unit in the priority job setting data and the communication address of each communication unit.

(1-4) Job-linked address transmitting unit that when a communication unit receives a type of a job from an external device, the job not being set to be given priority in the priority job setting data, transmits the communication address of another communication unit to the transmitter of the job, another communication unit being set to give priority to the job in the priority job setting data, through the communication unit.

When the image processor is provided with the constituent described in (1-3), an external device (equivalent to the terminal) capable of communicating with the image processor can automatically set the job type/address linking data corresponding to the priority job setting data.

When the image processor is provided with the constituent described in (1-4), an external device (equivalent to the terminal) capable of communicating with the image processor can automatically set the job type/address linking data (equivalent to the third job type/address linking data, which will be described later) corresponding to the priority job setting data, and retransmit a job to a transmission destination (communication address) where the job is processed in priority.

The image processor according to the first invention processes a second print job in priority over a first print job when the first print job arises at a communication unit not giving priority to a print process and the second print job arises at a communication unit giving priority to the print process during the process of the first print job. As a result, when the image processor executes an image forming process for both print jobs, recording papers bearing formed images corresponding to both print jobs are ejected in a mixed state onto a paper ejecting tray.

To prevent this from happening, the image processor according to the first invention may further include the following constituent described in (1-6).

(1-6) Nonpriority print job reserving unit that when a communication unit receives a print job from an external device, the print job not being set to be given priority in the priority job setting data, causes a given memory unit to store the print job or image data based on the print job in a state of not being subjected to the image forming process based on the print job.

In this case, a print process execution unit executes the print process based on the print job or image data that is stored in the memory unit by the nonpriority print job reserving unit, for example, when a given print start operation is made through an operation input unit.

Thus, even when another print job arises at the communication unit giving priority to the print job after the print job arises at the communication unit not giving priority to the print job, the image processor prevents mixing of the recording papers corresponding to both print jobs on the paper ejecting tray.

The image processor according to the first invention may further include each of the following constituents described in (1-7) to (1-9).

(1-7) Energization switching unit that makes switchover in separately energizing/deenergizing each of a plurality of functional blocks that is a component or an assembly of components divided according to each function.

(1-8) Necessary functional block determining unit that determines functional blocks that are necessary for executing a job received from an external device through a communication unit.

(1-9) Functional block automatic starting unit that changes the deenergized state of the functional block into an energized state, the functional block being among the functional blocks determined to be necessary by the necessary functional block determining unit, by controlling the energization switching unit.

The image processor further provided with the above constituents does not start up an unnecessary functional block upon receiving a job, thus reducing consumption power.

A second invention for achieving the above object is a job relay apparatus that is constructed to be capable of communicating with an image processor having a plurality of communication units, and that transfers a job to the image processor when receiving the job from a given external device. This relay apparatus includes the following constituents described in (2-1) to (2-3).

(2-1) Second job type/address linking data obtaining unit that obtains second job type/address linking data, which represents the corresponding relation between the type of each job and the communication address of each of the communication units of the image processor, from a memory unit storing the second job type/address linking data.

(2-2) Transfer destination address identifying unit that when receiving a job from an external device, identifies the address of a communication unit corresponding to the type of the job, the identification being made on the basis of the second job type/address linking data.

(2-3) Job transferring unit that transfers the job received from the external device to the address of the communication unit that is identified by the transfer destination address identifying unit.

The job relay apparatus according to the second invention receives a job from the terminal and transfers the job to the transmission destination of the job (communication unit of the image processor) in distribution according to the type of the job.

When such a job relay apparatus is provided to be capable of communicating with the image processor having a plurality of communication units, the job relay apparatus can serve as the fixed transmission destination of a job sent from each terminal (regardless of the type of the job).

Providing the job relay apparatus allows the avoidance of the arising of different types of jobs at the same communication unit of the image processor at overlapping timing, and also allows the avoidance of the arising of the same type of jobs at different communication units of the image processor at overlapping timing, as the avoidance of the same cases according to the above first invention.

This allows the prevention of such an inefficient situation as described above where a job standing by for execution occupies a communication unit to make impossible the reception of another job that can be processed using the communication unit.

As a result, the image processor prevents an inefficient situation where a plurality of jobs supposed to be processed concurrently in parallel processing cannot be processed concurrently, thus improves the image processor's job processing efficiency.

The image processor to which the job relay apparatus of the second invention transfers a job may be a conventional image processor having a plurality of communication units and a function of executing a plurality of jobs involving communication processes with external devices through the communication units.

The memory unit storing the second job type/address linking data may be incorporated into the job relay apparatus or into a device outside the job relay apparatus.

A third invention for achieving the above object is a job transmission program for causing a computer to execute each of the following processes described in (3-1) to (3-3), the computer being capable of communicating with an image processor having a plurality of communication units.

(3-1) Third job type/address linking data obtaining process of obtaining the third job type/address linking data, which represents the corresponding relation between the types of jobs and communication addresses, from a memory unit storing the third job type/address linking data.

(3-2) Transfer destination address identifying process of identifying an address corresponding to the type of a job to be transmitted, the identification being made on the basis of the third job type/address linking data.

(3-3) Job transmitting process of transmitting the job to the address identified by the transfer destination address identifying process through a given communication unit.

The job transmission program according to the third invention is the program executed by the terminal (external device) that is a computer that transmits a job to the image processor according to the above first invention.

The third invention may be provided as a job type/address linking data automatic setting program for causing the computer executing the job transmission program to execute each of the following processes described in (3-4) and (3-5).

(3-4) First job type/address linking data obtaining process of obtaining the first job type/address linking data from the image processor by communication through a given communication unit, the first job type/address linking data representing the corresponding relation between the type of each job set to be given priority by each communication unit of the image processor and the communication address of each communication unit.

(3-5) Third job type/address linking data automatic setting process of causing a given memory unit to store the third job type/address linking data on the basis of the first job type/address linking data obtained by the first job type/address linking data obtaining process, the third job type/address linking data representing the corresponding relation between the types of jobs and communication addresses.

The job type/address linking data automatic setting program causes the computer (i.e., terminal) to so automatically set the third job type/address linking data referred to by the computer as to correspond the third job type/address linking data to the priority job setting data referred to by the image processor of the first invention.

BRIEF DESCRIPTION OF THE DRAWINGS

FIG. 4 depicts an example of the data structure of a priority level table accessed by the image processor X1;

FIG. 5 depicts an example of the data structure of job type/subpower supply linking data accessed by the image processor X1;

FIGS. 6A and 6B each depict an example of the data structure of job/address linking data stored in a terminal that transmits a job to the image processor X1;

FIGS. 12A and 12B each depict an example of the data structure of data accessed by a relay server Y1 that is a constituent of the image processing system Z1;

FIG. 13 is a flowchart of a job transfer process executed by the relay server Y1; and FIG. 14 is a flowchart of a procedure for an updating process on abnormality presence/absence data, which process is executed by the relay server Y1 and an image processor X2 capable of communicating with the relay server Y1.

PREFERRED EMBODIMENTS OF THE INVENTION

Embodiments of the present invention will now be described with reference to the accompanying drawings to facilitate understanding of the present invention. The following embodiments provide a specific example of the present invention, and do not limit the technical scope of the present invention.

First Embodiment

Figure 1:
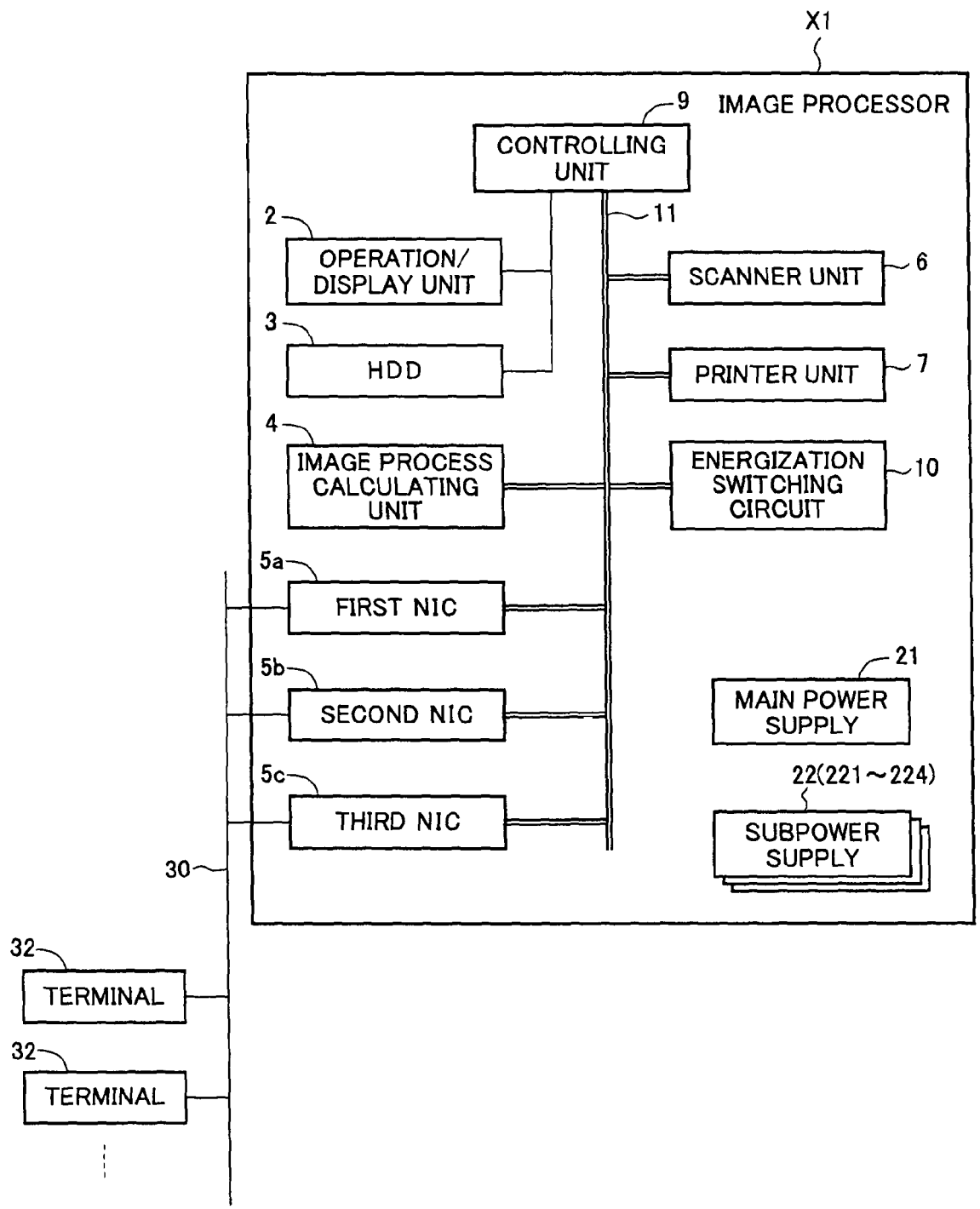
FIG. 1 is a block diagram of the outline configuration of an image processor X1 according to a first embodiment of the present invention.

FIG. 1 is a block diagram of the outline configuration of an image processor X1 according to the present invention.

The image processor X1 according to the present invention will first be described referring to the block diagram shown in FIG. 1.

The image processor X1 is constructed to be capable of communicating with a plurality of terminals 32 through a network 30 composed of LAN, etc.

The image processor X1 is constructed to be capable of communicating with the terminals 32 via, for example, the network 30 composed of LAN, WAN, etc., and includes a plurality of network interface cards 5a, 5b, 5c (hereinafter "NIC"), which are an example of a communication unit that carries out communication between the image processor X1 and the terminals 32. While the image processor X1 shown in FIG. 1 includes three NICs consisting of the first NIC 5a, the second NIC 5b, and the third NIC 5c, another image processor may include two, or four or more NICs. Hereinafter, these NICs will be expressed as NIC 5 when called collectively.

The image processor X1 has a function of executing a plurality of types of jobs involving communication processes by each NIC 5. These jobs include, for example, a print job, scan job, and data filing job.

The terminals 32 are computers, such as personal computers.

In addition to the plurality of NICs 5, as shown in FIG. 1, the image processor X1 includes an operation/display unit 2, a hard disc drive 3 (hereinafter "HDD"), an image process calculating unit 4, a scanner unit 6, a printer unit 7, a controlling unit 9, an energization switching circuit 10, a main power supply 21, and subpower supplies 22.

In FIG. 1, the controlling unit 9, the image process calculating unit 4, the NICs 5, the scanner unit 6, the printer unit 7, and the energization switching circuit 10 are interconnected through a bus 11.

The operation/display unit 2 has an operation input unit for inputting information, and an information display unit. The operation input unit is composed of, for example, sheet keys, a touch panel formed on the surface of a liquid crystal display device, etc. The display unit is composed of, for example, a liquid crystal display device, an LED lamp, etc. The operation/display unit 2 constitutes a man-to-machine interface for a user.

The HDD 3 is a large-capacity nonvolatile memory that stores processed data according to a need when image data read from a manuscript is processed or image data is printed out. The HDD 3 is also used as a unit that stores a data file transmitted from a terminal 32 in response to a request from the terminal 32 capable of communicating with the image processor X1. A job of executing processes of storing a data file transmitted from the terminal 32 in the HDD 3, changing the storage place (data folder) or name of the stored data file, data rewriting, data deletion, etc., is called a data filing job.

The image process calculating unit 4 is composed of a dedicated signal process circuit or a DSP (Digital Signal Processor), etc., and executes various image processes on image data, including generation of print data used for image formation (image data, print job, etc.), generation of image data sent to the terminal 32 (e.g., image data coded in such a prescribed format as JPEG format), encoding of image data, decoding of encoded image data, compression/coding of image data, and expansion (restoration) of compressed/coded image data.

The scanner unit 6 is an assembly of components including a unit that reads an image formed on a manuscript that is placed on a glass manuscript board, which is not shown, or is transferred from an ADF (Automatic Document Feeder), which is not shown, and a MPU (Micro-Processing Unit) that controls the unit.

In addition to the ADF, the scanner unit 6 also includes, for example, a mobile optical unit structured to be movable along a manuscript, which optical unit has a light source that emits light onto the image surface of the manuscript and a mirror that reflects reflected light from the manuscript in a given direction, a motor that drives the mobile optical unit, stationary mirrors that guide light emitted out of the mobile optical unit along a given path, a lens that condenses guided light, and a CCD (Charge Coupled Device) that converts light having passed through the lens into electricity to output an electric signal as strong as the quantity of light (i.e., light reflected at the image surface of the manuscript). The electric signal output from the CCD is transferred as image data to the image process calculating unit 4.

The printer unit 7 is an assembly of components including a unit that sequentially sends out recording paper stored in a paper feeding cassette, which is not shown, one by one to transfer the recording paper to a paper ejecting tray via a given image formation position, a unit that forms (outputs) an image on the recording paper at the image formation position on the basis of manuscript image data read by the scanner unit 6 from a manuscript or of printing image data generated by the image process calculating unit 4, and an MPU that controls the units.

The image processor X1 functions as a copier as the image processor X1 carries out an image forming process based on a manuscript image data, and functions as a printer as the processor X1 carries out an image forming process based on a print request (print job) received from the terminal 32.

The printer unit 7, for example, includes a photosensitive drum that carries an image, a charging unit that charges the photosensitive drum, an exposure device that writes a static latent image on the surface of the photosensitive drum, the latent image being based on given image data or print job, a developer that develops the static latent image into a toner image, a transferer that transfers the toner image on the photosensitive drum to a recording paper, and a motor that drives the photosensitive drum and recording paper transfer rollers.

The NIC 5 is a communication interface (example of the communication unit) that exchanges data with an external device, such as terminal 32, through the network 30, which is composed of, for example, a LAN conforming to the IEEE standard 802.3, the Internet, etc. The NIC 5 executes processes including, for example, a process of transmitting image data generated by the image process calculating unit 4, image data read by the scanner unit 6, or data stored in the HDD 3 to the terminal 32 connected to the network 30, and a process of receiving various jobs from the terminal 32. The jobs include the print job concerning a process of forming an image on a recording paper, the scan job concerning a process of reading an image from a manuscript, and the data filing job.

The main power supply 21 and the subpower supplies 22 are power circuits, supplying power to each of the constituents of the image processor X1.

The energization switching circuit 10 is the switching circuit (example of an energization switching unit) that makes switchover in connecting/disconnecting the subpower supply 22 to/from a commercial power supply according to a control signal coming from the NIC 5, thus making switchover in separately energizing/deenergizing each function block of the controlling unit 9, the scanner unit 6, the printer unit 7, etc. The energization switching circuit 10 is capable of making switchover in separately energizing/deenergizing each of the controlling unit 9, scanner unit 6, and printer unit 7, independent of energization of the NIC 5.

The controlling unit 9 controls the operation/display unit 2, the HDD 3, and the image process calculating unit 4. The controlling unit 9 sends/receives information needed for data processing executed by an MPU built in the scanner unit 6 and in the printer unit 7, and information obtained by the data processing.

For example, the controlling unit 9 delivers information of the size of a recording paper on which an image is to be formed, of a magnification/demagnification rate and a thickness correction value for an output image, and of selective execution of a color image forming process or a monochromic image forming process, to the MPU built in the printer unit 7, and obtains information of the number of recording papers finished with image formation and of an error occurring on the printer unit 7, from the MPU of the printer unit 7.

The controlling unit 9 also delivers information of an image reading range on a manuscript, to the MPU built in the scanner unit 6, and obtains information of the number of manuscripts finished with image reading under operation by the ADF, of image data read by the scanner unit 6, and of an error occurring on the ADF, from the MPU of the scanner unit 6.

As described above, each of the controlling unit 9, scanner unit 6, and print unit 7 is a functional block constructed as a component or an assembly of components that is divided according to each function.

Figure 2:
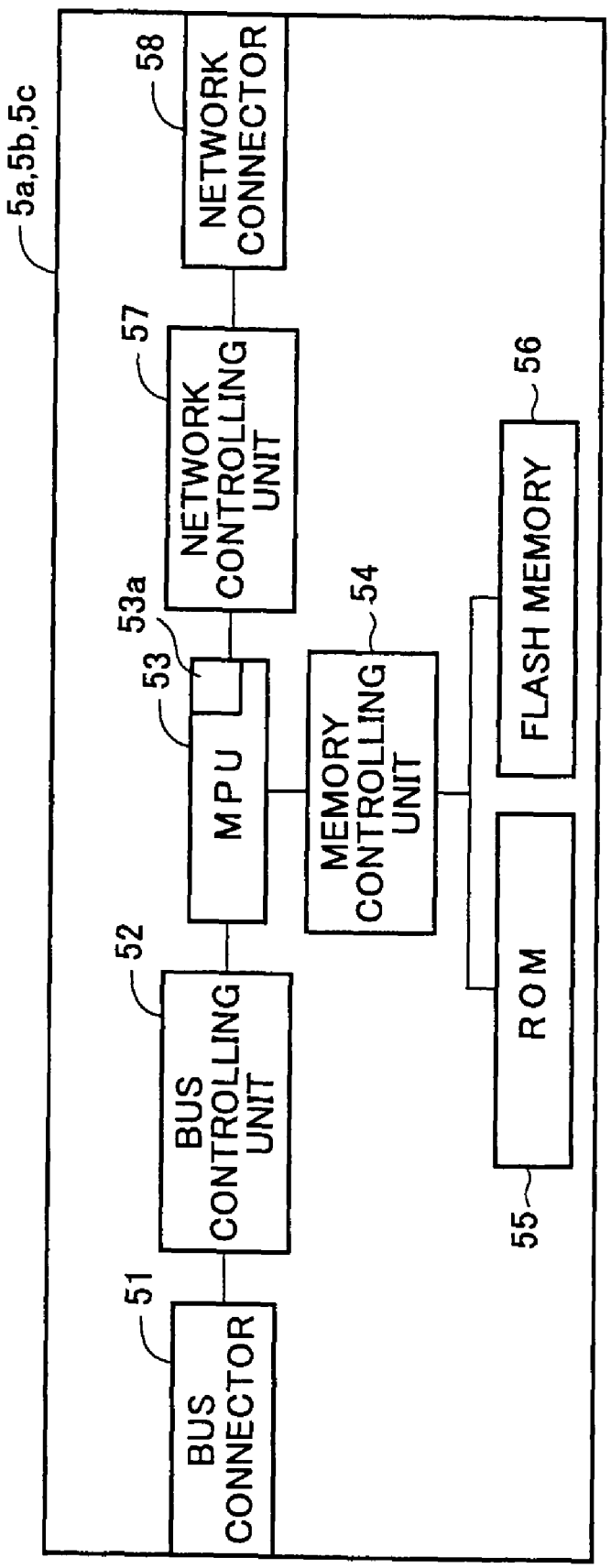
FIG. 2 is a block diagram of the outline configuration of an NIC incorporated into the image processor X1.

FIG. 2 is a block diagram of the outline configuration of the NIC incorporated in the image processor X1. The NIC 5 incorporated in the image processor X1 will be described referring to the block diagram shown in FIG. 2.

The NIC 5 includes a bus connector 51, a bus controlling unit 52, an MPU 53, a memory controlling unit 54, a ROM 55, a flash memory 56, a network controlling unit 57, and a network connector 58.

The bus connector 51 is the connector connected to the bus 11, and the bus controlling unit 52 carries out signal transmission to other units through the bus 11.

The network connector 58 is the connector physically connected to the network 30, and the network controlling unit 57 carries out communication control conforming to a given network protocol of, for example, IEEE standard 802.3, TCP/IP, etc.

The MPU 53 is the calculating unit that executes a program stored beforehand in the ROM 55 to carry out various processes including relaying signal transmission between the bus 11 and the network 30 and responding to a request for a given process from the terminal 32 via the network 30. The program to be executed is developed in a RAM (not shown) built in the MPU 53, and is executed. The MPU 53 makes access to the ROM 55 or to the flash memory 56 via the memory controlling unit 54.

The MPU 53 of the NIC 5 has a clock oscillator 53a that oscillates to generate clock signals at a given cycle. The MPU 53 of the NIC 5 counts a passed time on the basis of the totaled number of times of clock signal generation from the clock oscillator 53a.

The ROM 55 of the NIC 5 stores a program and data that are not scheduled to be changed out of programs and data that are executed or referred to by the MPU 53.

The flash memory 56 of the NIC 5 stores data that is stored in the flash memory 56 or referred to by the MPU 53 in the course of a process executed by the MPU 53. The data stored in the flash memory 56 or referred to by the MPU 53 includes the communication address of the NIC 5 (e.g., IP address), and firmware version information.

In FIG. 2, the flash memory 56 is provided as a nonvolatile memory device that allows the MPU 53 to write/read data in/out of the memory device. The flash memory 56 may be replaced with another nonvolatile memory device, such as EEPROM (Electrically Erasable Programmable Read-Only Memory).

<Power System>

Figure 3:
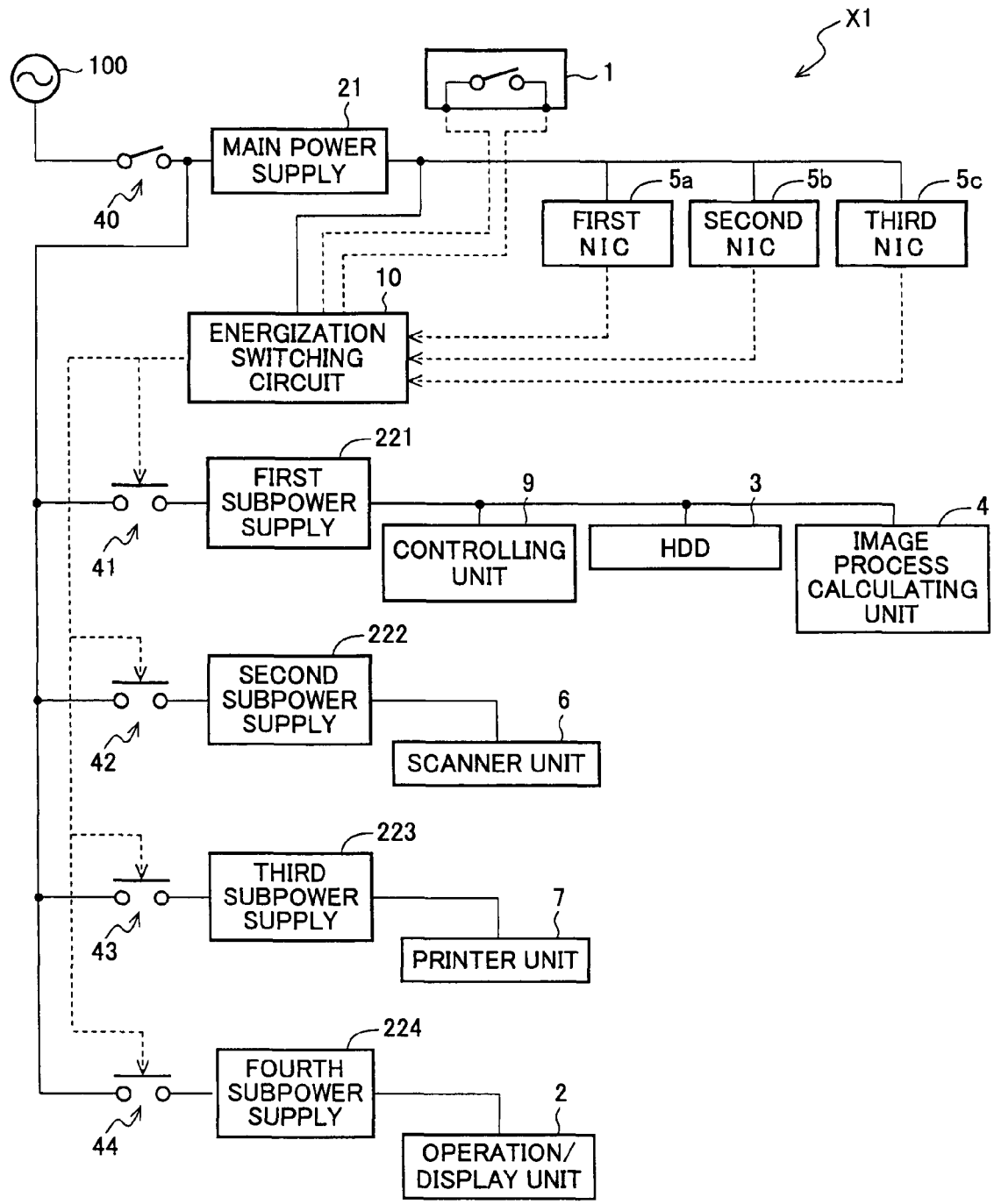
FIG. 3 is a power system diagram of a power connection relation in the image processor X1.

FIG. 3 is a power system diagram of a power connection relation in the image processor X1. An example of a power connection relation to each function block in the image processor X1 will be described referring to the power system diagram shown in FIG. 3.

In FIG. 3, power supply lines are represented by continuous lines, and signal transmission lines other than the power supply lines are represented by broken lines.

According to the power system diagram shown in FIG. 3, the image processor X1 has four subpower supplies 22, which are hereinafter called a first subpower supply 221 to a fourth subpower supply 224.

The main power supply 21 is the power supply that supplies power to the NIC 5 and to the energization switching circuit 10.

The main power supply 21 is connected to a commercial power supply 100, which is the primary power source to the whole of the image processor X1, via a manual changeover switch 40, with which changeover is made in connection/disconnection to/from the power supply lines by manual operation. A user carries out changeover operation on the manual changeover switch 40 to make changeover in energizing/deenergizing the NIC 5 and the energization switching circuit 10. The NIC 5 and energization switching circuit 10 are, therefore, kept in an energized state when the image processor X1 is connected to the commercial power supply 100 unless the user operates the manual changeover switch 40 to bring it into a disconnected state from a connected state. Once the manual changeover switch 40 is brought into the disconnected state, the whole of the image processor X1 is brought into a deenergized state (suspended state).

The first subpower supply 221 is the power supply circuit that supplies power to the controlling unit 9, to the HDD 3, and to the image process calculating unit 4.

The second subpower supply 222, the third subpower supply 223, the fourth subpower supply 224 are power supply circuits that supply power to the scanner unit 6, to the printer unit 7, and to the operation/display unit 2, respectively.

Each first subpower supply 221 to fourth subpower supply 224 is connected to the commercial power supply 100 via the manual changeover switch 40 and each automatic changeover switch 41 to 44, which makes changeover in connection/disconnection to/from the power supply line on the basis of a given control signal. As shown clearly in FIG. 3, a corresponding relation is established between the automatic changeover switch 41 and the first subpower supply 221, the automatic changeover switch 42 and the second subpower supply 222, the automatic changeover switch 43 and the third subpower supply 223, and the automatic changeover switch 44 and the fourth subpower supply 224.

As a result, when the manual changeover switch 40 is connected and then each automatic changeover switch 41 to 44 is connected, each subpower supply 221 to 224 is brought into the energized state.

Hereinafter, connection and disconnection of a power supply line is called turning on and turning off of the power supply line. Likewise, a connected state and disconnected state of a power supply line is called a turned-on state and turned-off state of the power supply line.

The automatic changeover switches 41 to 44 function as the energization switching unit that make switchover in separately energizing/deenergizing each function block 2, 6, 7, 9 as each changeover switch 41 to 44 is turned on or off.

Hereinafter, when the NIC 5 is in the energized state (manual changeover switch 40 is connected) and the function blocks 2, 6, 7, 9 are in the deenergized state (all automatic changeover switches 41 to 44 are turned off), an operation mode of the image processor X1 is called a sleep mode. When the NIC 5 and function blocks 2, 6, 7, 9 are in the energized state, an operation mode of the image processor X1 is called an operating mode.

As shown in FIG. 3, each NIC 5a to NIC 5c controls turning on and off of every automatic changeover switch 41 to 44 through the energization switching circuit 10, thus separately controls energization of each function block. The NICs 5a to 5c, therefore, serve also as a controlling unit that executes energization control over each function block.

The image processor X1 has an operation detecting switch 1 that is turned on and off by switching operation by the user. The turned-on state and turned-off state of the operation detecting switch 1 is detected by the energization switching circuit 10.

The operation detecting switch 1 functions as an energization switch that makes switchover in bringing the image processor X1 into either operating mode or sleep mode.

Specifically, when the operation detecting switch 1 is turned on in the sleep mode, the energization switching circuit 10 turns on every automatic changeover switch 41 to 44 to bring the image processor X1 into the operating mode.

When the operation detecting switch 1 is turned off in the operating mode, the energization switching circuit 10 turns off every automatic changeover switch 41 to 44 to bring the image processor X1 into the sleep mode unless any kind of job is being processed.

According to the image processor X1, when each function block is energized, the MPU 53 of any one of the NICs 5a to 5c (here, NIC 5a is assumed) determines on whether a sleep condition, which will be described later, is met. When the sleep condition is met, the NIC 5a controls the energization switching circuit 10, changing the mode of the image processor X1 into the sleep mode, where power supply to each function block is cut off. In the sleep mode, all four automatic changeover switches 41 to 44 are brought into "turned-off state" in changeover, which puts all function blocks supplied with power from four subpower supplies 221 to 224 into "deenergized state." In other words, a very few units including the NICs 5 (NICs 5 and the energization switching circuit 10) remain "energized state" in the image processor X1.

The sleep condition is the condition that no operation input through the operation/display unit 2 and no incoming data from a terminal 32 through the network 30 have been received for a given time or longer.

For example, when the NIC 5a determines on whether the sleep condition is met, the MPU 53 of the NIC 5a detects the presence/absence of operation input to the operation/display unit 2 via the controlling unit 9 and the bus 11, and detects the presence/absence of reception of data from the terminal 32 via the network controlling unit 57, and also detects the presence/absence of reception of data from the terminal 32 by the NIC 5b or NIC 5c via the bus 11.

By counting time based on clock signals from the clock oscillator 53a, the MPU 53 of the NIC 5a detects a fact that no operation input through the operation/display unit 2 and no data from the terminal 32 through the network 30 have been received for the given time or longer. According to the detected fact, the MPU 53 of the NIC 5a controls the automatic changeover switches 41 to 44 through the energization switching circuit 10 to change the state of each function block from the energized state to the deenergized state (from the operating mode to the sleep mode).

FIG. 4 depicts an example of the data structure of a priority level table accessed by the image processor X1, and FIG. 5 depicts an example of the data structure of job type/subpower supply linking data accessed by the image processor X1. The data accessed by the NIC 5 of the image processor X1 will be described referring to the data structure diagrams shown in FIGS. 4, 5.

FIG. 4 depicts an example of the data structure of the priority level table D11 accessed by the NIC 5 of the image processor X1.

The priority level table D11 is the setting data that sets the priority levels of a plurality of types of jobs for each NIC 5a to NIC 5c (an example of first job priority level setting data and priority job setting data).

According to the example shown in FIG. 4, for the first NIC 5a, the priority level of the print job (expressed as print in FIG. 4) is determined to be "1", the same of the data filing job (expressed as data filing in FIG. 4) is determined to be "2", and the same of the scan job (expressed as scan in FIG. 4) is determined to be "3". For convenience, the table shown here indicates that the smaller a priority level value is, the higher given priority is (higher priority level). The priority level values, therefore, mean the order of priority. Hence the print job is given the top priority at the first NIC 5a.

For the second NIC 5b, the scan job is given the top priority (priority level is "1"), the print job is given the priority next in order to that of the scan job (priority level is "2"), and the data filing job is given the priority next in order to that of the print job (priority level is "3").

For the third NIC 5c, the data filing job is given the top priority (priority level is "1"), the scan job is given the priority next in order to that of the data filing job (priority level is "2"), and the print job is given the priority next in order to that of the scan job (priority level is "3").

As described here, the contents of the priority level table D11 are so determined that each different type of the top priority job is set for each NIC 5a to 5c.

The priority level table D11 is, for example, stored in the flash memory 56 of each first NIC 5a to third NIC 5c in the form of the same data or of a divided piece of data.

The priority level table D11 may be stored in a memory unit of an external device that can be accessed by the image processor X1 through the NIC 5.

The MPU 53 of the NIC 5 accesses such a memory unit as flash memory 56 storing the priority level table D11 to obtain the priority level table D11 (an example of the priority job setting data) from the memory unit (an example of a priority job setting data obtaining unit).

The priority level table D11 is an example of the priority job setting data that sets the types of priority jobs for each of the NICs 5. The priority job setting data given by the table D11, therefore, does not necessarily have to include data on priority level setting when the priority job setting data provides the data that sets the types of (different) jobs to be processed in priority for each of the NICs 5a to 5c.

FIG. 5 depicts an example of the data structure of a job type/subpower supply linking table D12 accessed by the NIC 5 of the image processor X1.

The job type/subpower supply linking table D12 is the data indicating for each type of a job that which subpower supply must be turned on for execution of the job.

The job type/subpower supply linking table D12 shown in FIG. 5 thus indicates that the first subpower supply 221 and the second subpower supply 222 must be turned on for execution of the scan job (denoted by "SC" in FIG. 5), that the first subpower supply 221 and a third subpower supply 223 must be turned on for execution of the print job (denoted by "PR" in FIG. 5), and that the first subpower supply 221 must be turned on for execution of the data filing job (denoted by "DF" in FIG. 5).

The job type/subpower supply linking table D12 shown in FIG. 5 also indicates that the first subpower supply 221 must be turned on for execution of a memory print job (denoted by "MPR" in FIG. 5), which will be described later.

The job type/subpower supply linking table D12, therefore, indicates that the image process calculating unit 4 and scanner unit 6 are necessary but the printer unit 7 and operation/display unit 2 are unnecessary for execution of the scan job, that image process calculating unit 4 and printer unit 7 are necessary but the scanner unit 6 and operation/display unit 2 are unnecessary for execution of the print job, and that the controlling unit 9 and HDD 3 are necessary but the scanner unit 6, printer unit 7, and operation/display unit 2 are unnecessary for execution of the data filing job or memory print job.

The job type/subpower supply linking table D12 is, for example, stored beforehand in the flash memory 56 of each first NIC 5a to third NIC 5c, or may be stored in a memory unit of an external device that can be accessed by the image processor X1 through the NIC 5.

Job/address linking data D21 will then be described with reference to data structure diagrams shown in FIGS. 6A, 6B. The job/address linking data D21 is stored in the terminal 32 that transmits a job to the image processor X1.

The job/address linking data D21 is the data that sets the corresponding relation between the type of a job and the address of the transmission destination of the job, i.e., the communication address (IP address) of any one of the NICs 5a to 5c incorporated in the image processor X1 (an example of third job type/address linking data). The job/address linking data D21 is stored in a memory unit built in each terminal 32, such as hard disc drive.

Each terminal 32 determines the transmission destination of a job on the basis of the job type/address linking data D21 upon transmitting the job to the image processor X1.

The data structure diagram shown in FIG. 6A indicates each corresponding relation between the print job (print) and the address of the first NIC 5a, between the scan job and the address of the second NIC 5b, and between the data filing job and the address of the third NIC 5c. The job/address linking data D21 shown in FIG. 6A indicates the same corresponding relation between each of the NICs 5a to 5c and the type of the top priority job as indicated in the priority level table D11 shown in FIG. 4.

In contrast, the data structure diagram shown in FIG. 6B indicates each corresponding relation between the print job (print) and the address of the third NIC 5c, between the scan job and the address of the second NIC 5b, and between the data filing job and the address of the first NIC 5a. For the scan job, the job/address linking data D21 shown in FIG. 6B indicates the same corresponding relation between the NIC 5b and the type of the top priority job as indicated in the priority level table D11 shown in FIG. 4. For the print job and the data filing job, however, the job/address linking data D21 in FIG. 6B does not indicate the same corresponding relation between each of the NICs 5a, 5c and the type of the top priority job as indicated in the priority level table D11 in FIG. 4.

The job/address linking data D21 can be set by a user according to the user's wish through an information input unit, such as keyboard, incorporated in the terminal 32 (computer) as the terminal 32 executes a given program.

The terminal 32 (computer) has a function of automatically setting the job/address linking data D21 through execution of a given program.

Figure 9:
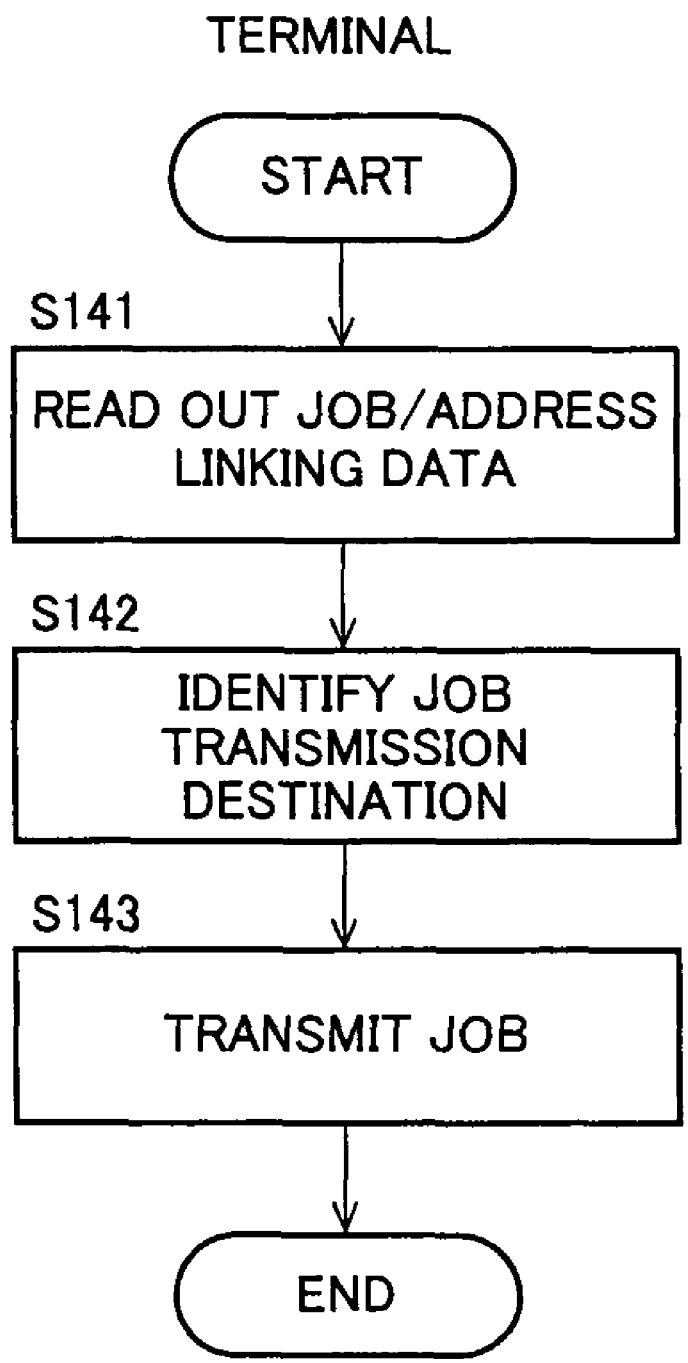
FIG. 9 is a flowchart of a processing procedure executed by the terminal that transmits a job to the image processor X1.

A procedure for a process (job transmission process) executed by a terminal 32 transmitting a job to the image processor X1 will be described with reference to a flowchart shown in FIG. 9. This process starts as the CPU of the terminal 32 (computer) executes a given program when the user carries out a given job transmission operation on the terminal 32. S141, S142—shown in the following description represent reference numerals denoting processes (steps).

At the start of the process, the CPU of the terminal 32 reads the job/address linking data D21 out of a hard disc drive, etc., built in the terminal 32 (S141: an example of a third job type/address linking data obtaining process).

The CPU of the terminal 32 then identifies the address corresponding to the type of the job to be transmitted on the basis of the job/address linking data D21 (S142: an example of a transfer destination address identifying process).

Subsequently, the CPU of the terminal 32 transmits the job to the address identified at step S142 through an NIC built in the terminal 32 (S143: an example of a job transmission process).

Through the above process, the terminal 32 transmits the job to the NIC 5 corresponding to the type of the job.

A procedure for an automatic setting process on the job/address linking data D21, which procedure is executed by the image processor X1 and the terminal 32, will then be described with reference to a flowchart shown in FIG. 8. This process starts as the CPU of the terminal 32 (computer) executes a given program when the user carries out a given start operation on the terminal 32. S121, S122—shown in the following description represent reference numerals denoting processes (steps).

At the start of the procedure, the terminal 32 searches the NICs 5 of image processor X1 that are connected to the network 30, and transmits a given job/address linking data request command to each of the NICs 5 (first NIC 5a to third NIC 5c) (S131).

Meanwhile, the MPU 53 of each NIC 5*a* to NIC 5*c* of the image processor X1 monitors the arrival of the job/address linking data request command (S121). Upon confirming the arrival of the command, the MPU 53 generates the job/address linking data that represents the corresponding relation between the type of each job set to be given priority (job of highest priority level) by each of the NICs 5*a* to 5*c* and the communication address (IP address) of each of the NICs 5*a* to 5*c* (an example of first job type/address linking data) (S122). The MPU 53 of each of the NICs 5*a* to 5*c* then sends back (transmits) the generated data to the terminal 32 through the network 30 (S123: an example of first job type/address linking data transmitting unit). After sending back the generated data, the MPU 53 of each of the NICs 5*a* to 5*c* of the image processor X1 returns to the process at step S121.

After transmitting the job/address linking data request command, the terminal 32 waits a replay from each of NICs 5*a* to 5*c* of the image processor X1, and then receives (obtains) replay data (job/address linking data) through the NIC built in the terminal 32 (S132: an example of first job type/address linking data obtaining process).

The terminal 32 then causes the memory unit built in the terminal 32, such as hard disc drive, to store the job/address linking data D21 that corresponds to the data (the example of the first job type/address linking data) obtained by the process at step S132 (an example of third job type/address linking data automatic setting process). Subsequently, the automatic setting process comes to an end.

Through execution of the above process, the terminal 32 stores the job/address linking data D21 shown in FIG. 6A, i.e., the job/address linking data D21 that indicates the same corresponding relation between each of the NICs 5*a* to 5*c* and the type of the top priority job as indicated in the priority level table D11 shown in FIG. 4.

The program for causing the terminal 32 (computer) to execute steps S131 to S133 is an example of a job type/address linking data automatic setting program.

A procedure for a job executed by the image processor X1 will then be described with reference to a flowchart shown in FIG. 7. S101, S102—shown in the following description represent reference numerals denoting processes (steps). The following processes executed by the NIC 5 represent the processes executed independently by each first NIC 5*a* to third NIC 5*c*.

<Step S101 to S103>

At the start, the MPU 53 of each NIC 5 (5*a* to 5*c*) carries out monitoring to see whether a new job has arisen (S101). The arising of a new job includes the reception of a new job, such as print job and data filing job, from an external terminal 32 through the network 30, and the arising of a new job resulting from operation input to the image processor X1, which new job is executed in such a way that the scanner unit 6 reads image data from a manuscript and the image processor X1 transmits the image data to a specified terminal 32 through the NIC 5.

Upon confirming the arising of a new job, the MPU 53 of the NIC 5 determines on the type of the new job according to the contents of the job, and identifies the priority level of the new job on the basis of the priority level table D11 read out of the flash memory 56 (S102). Thus, the priority level of the new job is identified according to a combination of a NIC 5 used by the new job and the type of the new job. The NIC 5 used by the new job means the NIC 5 that receives the new job from the terminal 32, or the NIC 5 that is used by the scan job, which is executed according to the operation on the image processor X1, for transmitting the image data (NIC 5 set to give the top priority to the scan job in the priority level table D11).

Based on the priority level of the new job, the MPU 53 of the NIC 5 determines on whether the new job is a priority job (whether the new job is the top priority job (job given the priority level "1"))(S103).

<S104 to S106>

When determined that the new job is not the priority job (nonpriority job), the MPU 53 of the NIC 5 executes the following process at steps S104 to S106.

The MPU 53 of the NIC 5 first identifies an NIC that processes the new job in priority (NIC for which the priority level of the new job is determined to be "1") out of the first NIC 5*a* to third NIC 5*c* on the basis of the priority level table D11. The MPU 53 then sends a notice of the address (IP address) of the identified NIC 5 to the terminal 32 having transmitted the new job through the network 30 (S104).

In other words, at step S104, when the MPU 53 of the NIC 5 receives a type of new job that is not set to be given priority in the priority level table D11 through the terminal 32, the MPU 53 transmits the communication address of another NIC 5 that is set to give the new job priority in the priority level table D11 to the transmitter of the new job through the NIC 5 (any one of the NIC 5*a* to 5*c*) (an example of a job linking address transmitting unit).

The terminal 32 receiving the notice, for example, outputs a caution telling that the job/address linking data D21 stored in the memory unit of the terminal 32 does not match in contents to the priority level table D11 set in the image processor X1, through a display of the terminal 32. This prompts a user of the terminal 32 containing the preset job/address linking data D21 not corresponding in contents to the priority level table D11 (see FIG. 6B) to change the setting of the job/address linking data D21 to give it the contents corresponding to that of the priority level table D11.

In another case, the terminal 32 receiving the notice executes a given program to automatically update the job/address linking data D21 stored in the memory unit of the terminal 32 according to the contents of the notice.

The MPU 53 of the NIC 5 also determines on whether the new job is the print job (S105). When determining the new job to be the print job, the MPU 53 makes setting for regarding and processing the print job (new job) as the memory print job from that point on (setting prescribed flag information, etc.) (S106). Hereinafter, making this setting will be referred to as setting the print job to be processed as the memory print job.

The memory print job is the job carried out in such a way that the HDD 3 stores the print job or image data based on the print job while an image forming process (process of printing an image on a recording paper at the printer unit 7) based on the print job is not executed. Thus, the image forming process (print process) based on the print job or image data stored in the HDD 3 is executed by the printer unit 7, for example, when a print start operation specifying the stored data is carried out through the operation/display unit 2.

In this memory print job, the MPU 53 of the NIC 5 delivers the print job (new job) to the controlling unit 9, which causes the HDD 3 to store the print job.

<S107 to S108>

When MPU 53 of the NIC 5 determines the new job to be a priority job at step S103 or executes the process at steps S104 to S106, the MPU 53 determines on whether a job on execution is present at the present point in the image processor X1 (S107), and, when the job on execution is present, determines on whether the job on execution and the new job can be subjected to parallel processing (S108). As described above, when the new job is a nonpriority job and is the print job, the MPU 53 of the NIC 5 handles the new job as the memory print job.

The MPU 53 of the NIC 5 determines parallel processing of both jobs (job on execution and new job) to be impossible when both jobs involving communication through NICs 5 use the same NIC 5 or are the same type of jobs. The MPU 53 determines parallel processing of both jobs to be possible when both jobs do not use the same NIC 5 and are not the same type, either. Exceptionally, however, the MPU 53 of the NIC 5 determines parallel processing of the print job (new job) regarded as the memory print job at step S106 to be possible when the job on execution is the print job or scan job, and determines parallel processing of the same to be impossible when the job on execution is the data filing job, even if the print job uses the NIC 5 different from that used by the job on execution.

When determining that no job on execution is present, or that parallel processing of the job on execution and new job is possible, the MPU 53 of the NIC 5 proceeds to the process at step S112, which will be described later.

When determining that parallel processing of the job on execution and new job is impossible, the MPU 53 of the NIC 5 proceeds to the process at step S109 described below.

<S109 to S111>

At step S109, the MPU 53 of the NIC 5 compares the priority level of the job on execution with that of the new job to determine on whether the priority level of the new job is higher. Specifically, the MPU 53 of the NIC 5 determines on whether a combination of the NIC 5 used by the new job and the type of the new job is given higher priority level (priority level of a smaller numerical value) over a combination of the NIC 5 used by the job on execution and the type of the job on execution in setting in the priority level table D11.

When determining that the priority level of the new job is not higher than that of the job on execution (including a case where both jobs are given the same priority level), the MPU 53 of the NIC 5 sends a response (reply) of "BUSY" information, which tells that the new job is not acceptable, to the terminal 32 having transmitted the new job (S110).

At this point, the terminal 32 receiving the "BUSY" information response suspends the transmission of the job. The terminal 32 may resend the suspended job after a given time according to a preset job resending condition.

On the other hand, when the MPU 53 of the NIC 5 determines that the priority level of the new job is higher (smaller in numerical value) than that of the job on execution, the MPU 53 carries out a suspension process on the job on execution (job involving communication through the NIC 5) (S111), and then proceeds to the process at step S112, which will be described later.

According to the suspension process, for example, the MPU 53 of an NIC 5 used by the job on execution assigns identification information of the job on execution to the MPU 53 of the NIC 5, which memorizes the identification information and the address of the terminal 32 having transmitted the job on execution, and transmits suspension request information, which includes the identification information of the job on execution and a command commanding the suspension of transmission of the job, to the transmitter of the job (terminal 32). As a result, the terminal 32 suspends the transmission of the job until receiving a suspended job resume request containing the identification information of the job.

Data sent through the network 30 is divided into units of data packets, so that job suspension at step S111 is carried out at timing of packet division.

<S112 to S113>

At step S112, the MPU 53 of the NIC 5 changes "deenergized state" of a functional block among functional blocks necessary for execution of the new job (new job using the NIC 5) into "energized state (state of being started up)" through control over the energization switching circuit 10 (S113: an example of a functional block automatic starting unit). This means that the MPU 53 of the NIC 5 does not start up a functional block not necessary for execution of the new job even if the functional block is in "deenergized state".

In this process, based on the job type/subpower supply linking table D12 stored in the flash memory 56, the MPU 53 of the NIC 5 determines on which subpower supply is to be turned on, that is, which functional block is to be started up.

In this manner, the image processor X1 does not start up an unnecessary functional block when a new job arises, thus reduces consumption power.

<S114>

When the functional blocks necessary for execution of the new job are brought into "energized state" by the process at steps S112, 113, the MPU 53 of the NIC 5 starts a communication process (transmission/reception of a job or data) accompanying execution of the new job, and execution of the new job (S114).

Specifically, when the new job is the print job, the MPU 53 of the NIC 5 delivers the new job directly to the printer unit 7, or indirectly to the same through the controlling unit 9. The printer unit 7 then executes a print process (image formation on a recording paper) based on the print job.

When the new job is the scan job (request for transmission of image data read from a manuscript), the scanner unit 6 reads image data from a manuscript, which is placed on a manuscript board or transferred from an ADF (Automatic Document Feeder), and delivers the image data to the NIC 5 that is set to give the top priority (the priority level "1") to the scan job in the priority level table D11. The NIC 5 then transmits the image data to the transmitter (terminal 32) of the new job.

When the new job is the data filing job, the controlling unit 9 exchanges data with the terminal 32 and accesses the HDD 3 through the NIC 5 having received the new job. In this process, a data file is stored in the HDD 3, the storage place (data folder) of the data file is changed, a file name is changed, and data is rewritten or deleted.

When the new job is the print job that is set to be processed as the memory print job at step S106, the MPU 53 of the NIC 5 delivers the new job (print job) to the controlling unit 9, which causes the HDD 3 to store the new job.

Specifically, when the NIC 5 receives the print job not set to be given priority (not set to be given the priority level "1") in the priority level table D11 from the terminal 32, the controlling unit 9 causes the HDD 3 to store the print job while the image forming process based on the print job (new job) is not carried out (example of a nonpriority print job reserving unit). In another way, the image process calculating unit 4 may convert the print job into image data for electrostatic latent image writing, and then the HDD 3 stores the converted image data (example of the nonpriority print job reserving unit).

As described above, when a plurality of jobs involving communication process through the NICs 5 arise at overlapping timing (when a determination is made at step S107 that the job on execution is present), the MPU 53 of the NIC 5 used by the new job (e.g., the NIC 5 having received the new job from the terminal 32) suspends the job that has been executed so far (S111), and pushes the new job interruptively into the execution process (S114). The MPU 53 of the NIC 5 thus carries out control so that a job of a higher priority level (a type of job set to be given priority in the priority level table D11) is processed in priority by functional blocks (an example of a priority job controlling unit).
<S115 to S117>

The MPU 53 of the NIC 5 then determines on whether the job suspended at step S111 is present (S115). The MPU 53 proceeds to the process at step S116, which is to be described next, when determining that the suspended job is present, and goes back to the process at step S101 described before when determining that the suspended job is not present.

The MPU 53 of the NIC 5 determines on the presence/absence of the suspended job based on whether the MPU 53 has a memory of identification information of the suspended job.

At step S116, the MPU 53 of the NIC 5 waits the end of the job pushed interruptively into the execution process at step S114 (S116), and executes a process (resuming process) of resuming the job suspended at step S111 (S117). Afterward, the MPU 53 returns to the above process at step S101.

This resuming process is, for example, the process of sending a request for resuming the suspended job, which request includes the identification information of the suspended job saved by the MPU 53 of the NIC 5 at step S111, to the address of the terminal 32 (address of the transmitter of the suspended job), which is also saved by the MPU 53 at step S111. Thus, the terminal 32 receiving the request for resuming the suspended job resumes the transmission of the suspended job.

Figure 10:
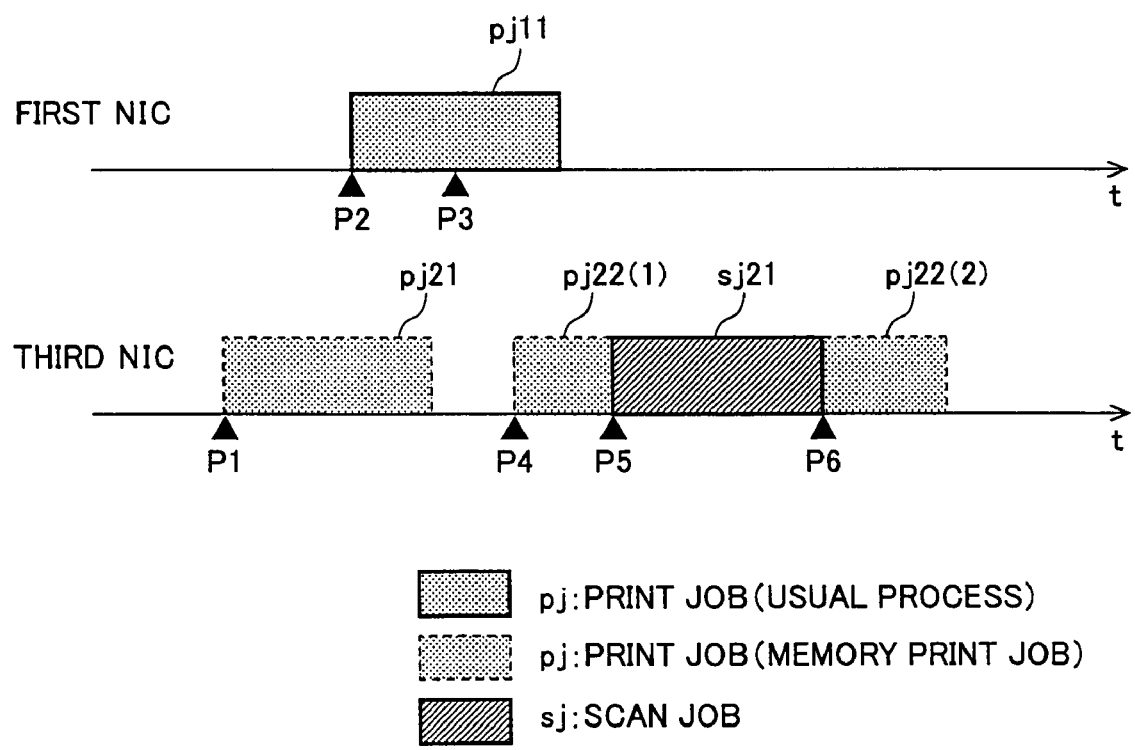
FIG. 10 is a time chart of an example of a job processing status in the image processor X1.

An example of a job processing status arising in the image processor X1, which status arises as a result of execution of the process shown in FIG. 8 by the image processor X1, will then be described with reference to a time chart shown in FIG. 10. Four patterns of the job processing status consisting of a first pattern to a fourth pattern will be described. For convenience, a time gap occurring during job execution or job interruption is omitted from FIG. 10.
<First Pattern>

The first pattern represents a case where a terminal 32 containing the preset job/address linking data D21 shown in FIG. 6B transmits a print job pj21 to the third NIC 5c of the image processor X1 while the image processor X1 is not executing any job. A point P1 in FIG. 10 represents the point at which the print job pj21 (equivalent to the above new job) has reached the third NIC 5c.

Figure 7:
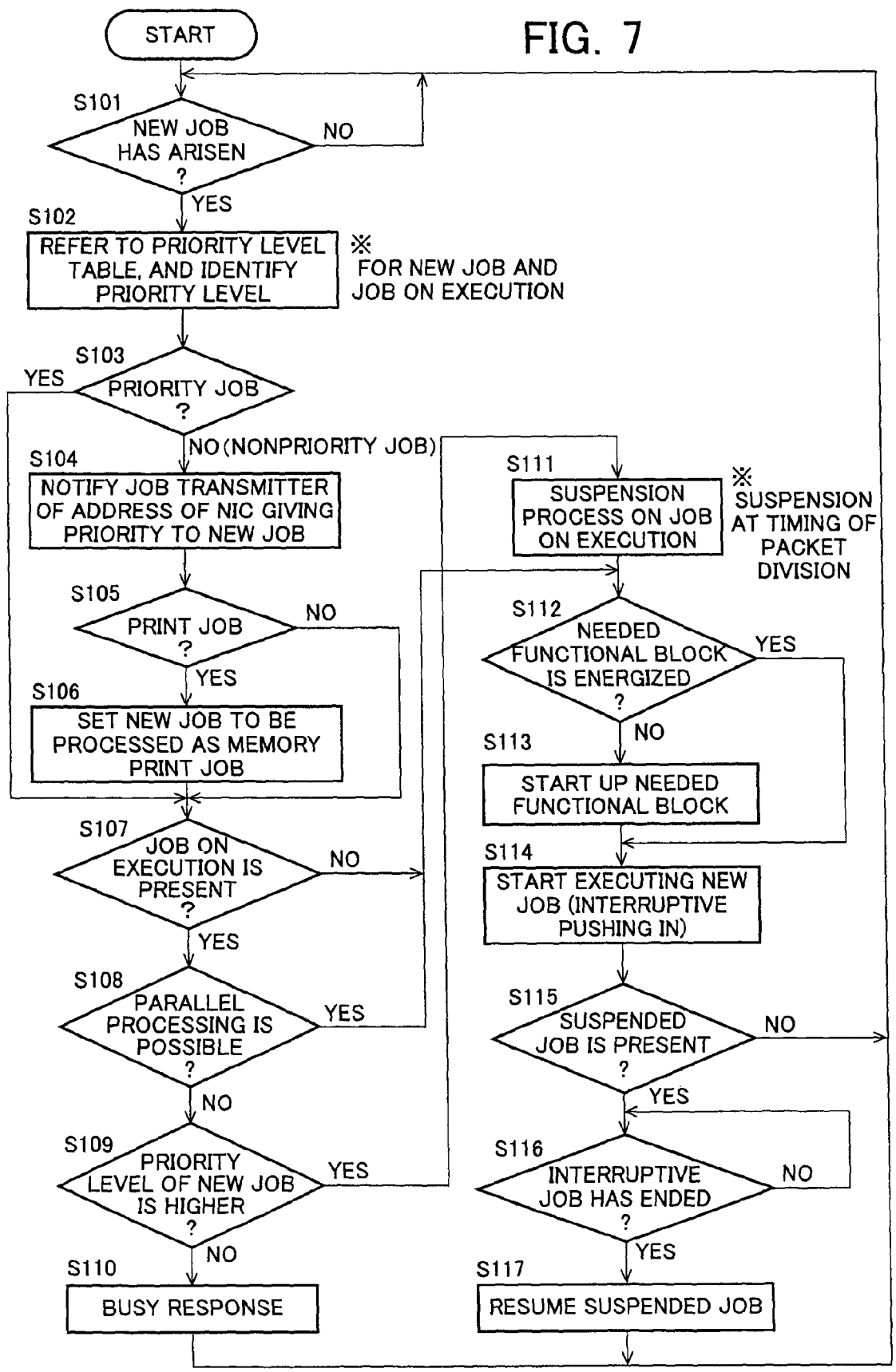
FIG. 7 is a flowchart of a procedure for a job executed by the image processor X1.

In this case, the process executed by the image processor X1 starts from step S103 to proceed to steps S104 to 106, further proceeding from step S107 to step S114 via S112, as shown in FIG. 7.

The print job pj21 is, therefore, processed as the memory print job at step S106, and is stored in the HDD 3.
<Second Pattern>

The second pattern represents a case where a terminal 32 containing the preset job/address linking data D21 shown in FIG. 6A transmits a print job pj11 to the first NIC 5a of the image processor X1 while the print job pj21 is being processed as the memory print job. A point P2 in FIG. 10 represents the point at which the print job pj11 (equivalent to the above new job) has reached the first NIC 5a.

In this case, the process executed by the image processor X1 starts from step S103 to proceed to steps S107 to 108, further proceeding to step S114 via S112, as shown in FIG. 7.

The print job pj11 is, therefore, executed concurrently in parallel processing with the print job pj21 that is on execution as the memory print job.

In the above process, the first print job pj21, which is not set to be a top priority job, is processed as the memory print job. Because of this, even if the print job pj11, which is a top priority job, arises at overlapping timing to the print job pj21, ejection of mixed recording papers bearing the images corresponding to both print jobs pj21, pj11 onto a paper ejecting tray is prevented.
<Third Pattern>

The third pattern represents a case where a terminal 32 containing the preset job/address linking data D21 shown in FIG. 6B transmits a print job pj22 to the third NIC 5c of the image processor X1 while only the top priority print job pj11 is being processed. A point P4 in FIG. 10 represents the point at which the print job pj22 (equivalent to the above new job) has reached the third NIC 5c. In FIG. 10, pj22(1) represents the portion of print job 22 that ranges from the head to the middle, and pj22(2) represents the portion of print job 22 that ranges from the middle to the tail. Putting pj22(1) and pj22(2) together, therefore, gives the whole of the print job pj22.

In this case, the process executed by the image processor X1 starts from step S103 to proceed to steps S104 to 106, further proceeding from step S107 to step S114 via step S108 and step S112, as shown in FIG. 7.

The print job pj22 is, therefore, processed as the memory print job at step S106, and is stored in the HDD 3. This storage process on the print job pj22 is carried out concurrently in parallel processing with the process on the print job pj11.
<Fourth Pattern>

The fourth pattern represents a case where a terminal 32 containing the preset job/address linking data D21 shown in FIG. 6A transmits a scan job sj21 to the third NIC 5c of the image processor X1 while the print job pj22 is being processed as the memory print job. A point P5 in FIG. 10 represents the point at which the scan job sj21 (equivalent to the above new job) has reached the third NIC 5c.

In this case, the process executed by the image processor X1 starts from step S103 to proceed to steps S107 to S111, further proceeding to step S114 via step S112, as shown in FIG. 7. Then, the process still further proceeds to steps S116, S117 via step S115.

The print job pj22, which is on execution as the memory print job, is, therefore, suspended, and a newly arising scan job sj21 of higher priority is pushed interruptively into the execution process.

Following the end of the scan job sj21, the process on the rest of the suspended print job pj22, which is denoted by pj22(2), is resumed.

The image processor X1 as described above processes in priority a type of a job preset for each of a plurality of NICs 5. A terminal 32 transmitting a job to the image processor X1 transmits the job to the address of the NIC 5 corresponding to the type of the job on the basis of the job/address linking data D21.

If the contents of the job/address linking data D21, which each terminal 32 refers to, is set to the contents in line with the corresponding relation between the types of top priority jobs and the NICs 5 in the priority level table D11, as shown in FIG. 6A, a job (new job) transmitted from each terminal 32 to the image processor X1 is processed in priority unless the same type of a job is on execution. For this reason, a user is encouraged to set the contents of the job/address linking data D21 referred to by each terminal 32 to the contents in line with the priority level table D11.

Figure 8:
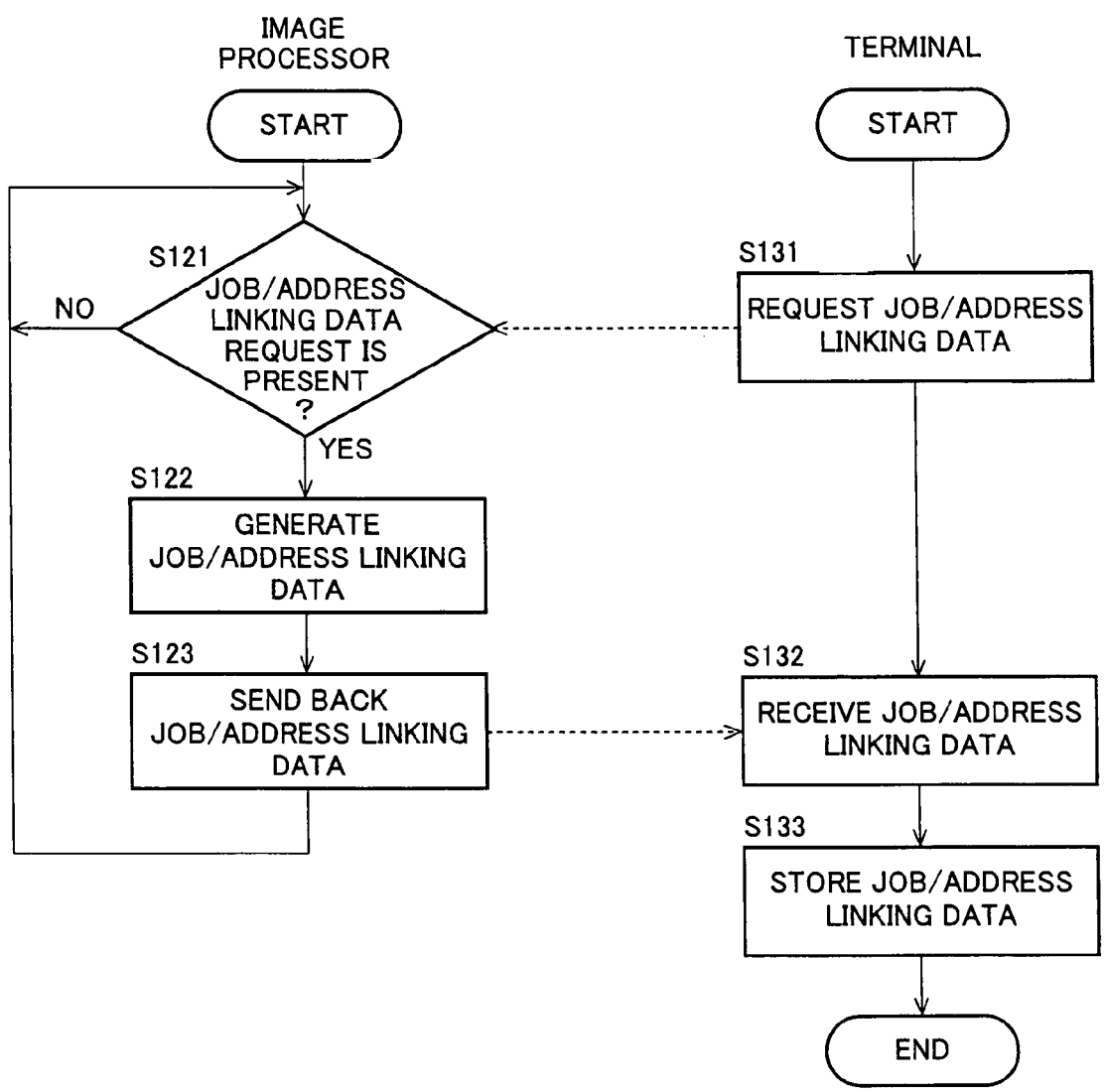
FIG. 8 is a flowchart of a procedure for an automatic setting process on the job/address linking data, which process is executed by the image processor X1 and the terminal.

Particularly, when the process shown in FIG. 8 is executed, each terminal 32 automatically sets the contents of the job/address linking data D21 referred to by the terminal to the contents in line with that of the priority level table D11 referred to by the image processor X1.

When the contents of the job/address linking data D21 referred to by each terminal 32 is set to the contents in line with that of the priority level table D11, the arising of different types of jobs at the same NIC 5 of the image processor X1 at overlapping timing can be avoided. This allows the prevention of such an inefficient situation where only one job is executed when a plurality of jobs that can be processed concurrently in parallel processing (e.g., print job and scan job) arise because the NIC 5 has to work on overlapping jobs.

Likewise, the arising of the same type of jobs at different NICs 5 of the image processor x1 at overlapping timing can also be avoided. This allows the prevention of such an inefficient situation where a job standing by for execution occupies an NIC 5 to makes impossible reception of another job that can be processed using the occupied NIC 5.

As a result, the image processor X1 prevents an inefficient situation where a plurality of jobs supposed to be processed concurrently in parallel processing cannot be processed concurrently, thus improves the image processor's job processing efficiency.

When the image processor X1 receives a job from a terminal 32 containing the preset job/address linking data D21 not corresponding in contents to the priority level table D11 (see FIG. 6B), the image processor X1 sends a notice to the terminal 32 by executing the process at step S104.

Regarding a method for prompting the user of the terminal 32 containing the preset job/address linking data D21 not corresponding in contents to the priority level table D11 to change the setting contents of the preset job/address linking data D21 to the contents in line with that of the priority level table D11, the following method is also applicable.

For example, when a new job is the print job that is not a priority job (top priority job), the image processor X1 may execute the following process.

First, based on the priority level table D11, the MPU 53 of the NIC 5 identifies the address of the NIC 5 (hereinafter "right address") that processes the new job in priority (gives the new job the priority level "1") out of the first NIC 5a to third NIC 5c.

Then, at step S114, the MPU 53 of the NIC 5 delivers the right address to the printer unit 7, which then executes a process of printing a given notice message (message advising a change of the job/address linking data D21), which includes the right address, on a recording paper upon executing the image forming process based on the print job (nonpriority job).

This process also prompts the user of the terminal 32 to change the setting contents of the preset job/address linking data D21 of the terminal 32 to the contents in line with that of the priority level table D11.

Second Embodiment

Figure 11:
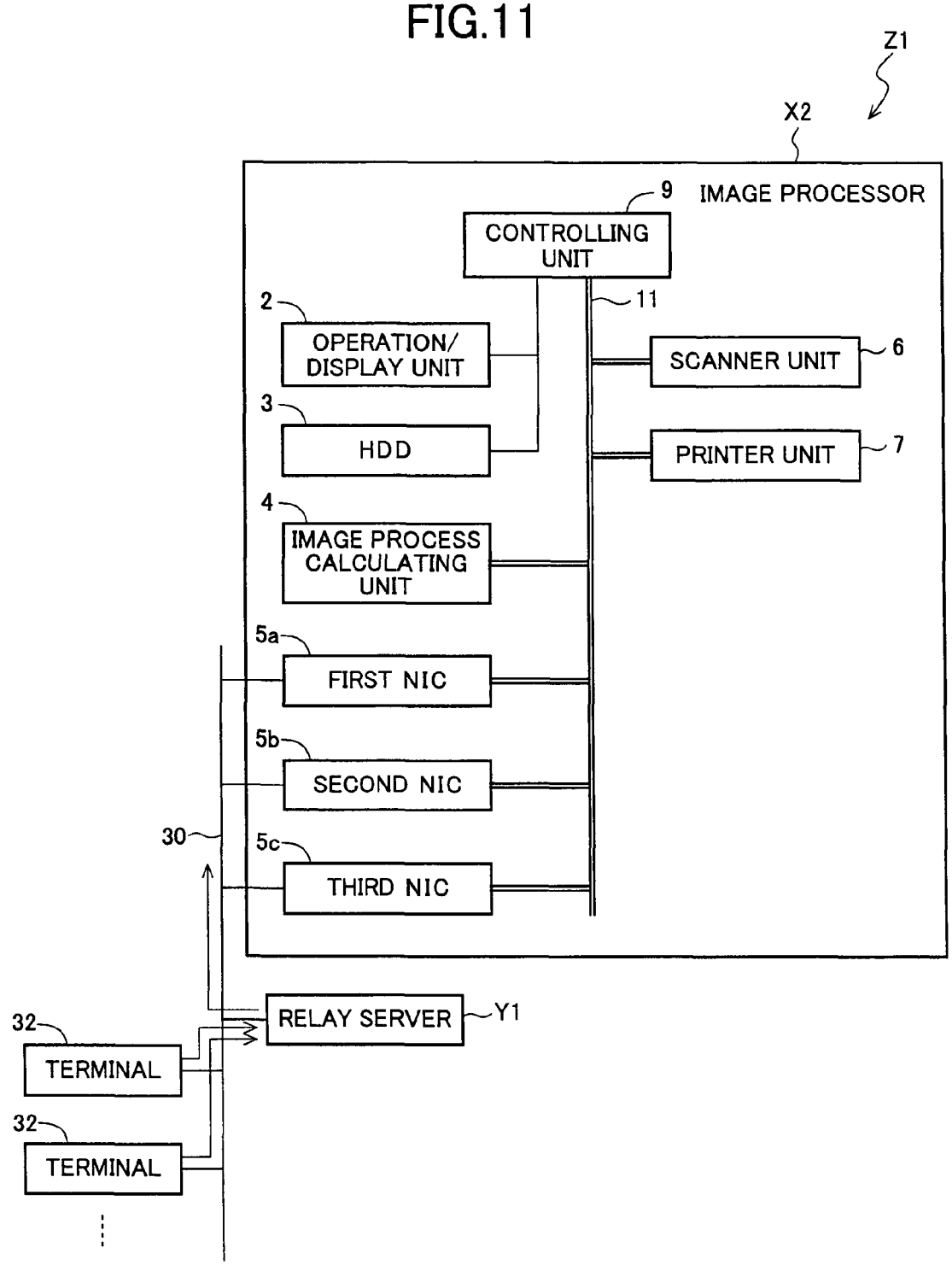
FIG. 11 is a block diagram of the outline configuration of an image processing system Z1 according to a second embodiment of the present invention.

FIG. 11 is a block diagram of the outline configuration of an image processing system Z1 according to a second embodiment of the present invention. The image processing system Z1 according to the second embodiment of the present invention will be described with reference to the block diagram shown in FIG. 11.

The image processing system Z1 includes an image processor X2 and a relay server Y1, which can communicate with each other via the network 30.

Similar to the image processor X1, the image processor X2 is the image processor (complex machine) that has a plurality of NICs 5 consisting of the NIC 5a to NIC 5c, and a function of executing a plurality of types of jobs involving communication processes through the NICs 5. The image processor X2 has the same hardware as the image processor X1 does, so that the description of the hardware will be omitted. The procedure for a job executed by the image processor X2 is, however, different from that by the image processor X1 as shown in FIG. 7.

The image processor X2 executes the process that is given by omitting steps S102 to S106, S109, S111, and S115 to S117 from steps included in the job procedure shown in FIG. 7. This process represents the process executed by a conventional complex machine (image processor), except steps S112 and S113.

The relay server Y1 has an NIC (not shown) capable of communicating with the image processor X2 through the network 30. The relay server Y1 is a computer (an example of a job relay apparatus) that transfers a job to the image processor X2 when receiving the job from a terminal 32. In addition to the NIC, the relay server Y1 includes such equipment incorporated in an ordinary computer as a CPU, hard disc drive, display, and information input devices (keyboard, mouse, etc.).

The terminal 32 is composed of a personal computer, etc., as the terminal 32 according to the first embodiment.

In the terminal 32 of the second embodiment, however, the address of the NIC incorporated in the relay server Y1 is preset as the transmission destination address of a job. A job transmitted from each terminal 32, therefore, travels through the relay server Y1 to reach the image processor X2, regardless of the type of the job.

Data accessed by the relay server Y1 will then be described with reference to data structure diagrams shown in FIGS. 12A and 12B.

FIG. 12A depicts the data structure of job/address linking data D31 (an example of second job type/address linking data) that represents the corresponding relation between the type of each job and the communication address (IP address) of each of the NICs 5a to 5c incorporated in the image processor X2.

FIG. 12B depicts the data structure of abnormality presence/absence data D32 that indicates for each type of a job whether equipment of the image processor X2 used for execution of the job shows any abnormality (presence/absence of abnormality).

In FIGS. 12a, 12B, "print" represents the print job, "scan" represents the scan job, and "data filing" represents the data filing job.

In FIG. 12B, "present" means equipment necessary for the image processor X2 to execute the job shows an abnormality, and "absence" means equipment necessary for execution of the job shows no abnormality.

These job/address linking data D31 and abnormality presence/absence data D32 are, for example, stored in a memory unit, such as hard disc drive, built in the relay server Y1. The relay server Y1 may store the job/address linking data D31 and abnormality presence/absence data D32 in a memory unit of an external device that the relay server Y1 can access through the NIC (not shown) built in the relay server Y1.

The CPU (not shown) built in the relay server Y1 accesses the memory unit, such as hard disc drive, storing the job/address linking data D31 and abnormality presence/absence data D32, and obtains both data D31, D32 from the memory unit (an example of a second job type/address linking data obtaining unit).

A procedure for an updating process on the abnormality presence/absence data, which process is executed by the relay server Y1 and the image processor X2 capable of communicating with the relay server Y1, will then be described with reference to a flowchart shown in FIG. 14. In the following description, S221, S222—represent reference numerals denoting processes (steps). The process executed by the NIC 5 of the image processor X2, as shown in FIG. 14, means the process executed by, for example, any one of the NIC 5a to NIC 5c. The process to be executed by the relay server Y1 is put into practice as the CPU built in the relay server Y1 runs a program stored in the memory unit, such as hard disc drive, also built in the relay server Y1.

<Step S221>

The MPU 53 of the NIC 5 incorporated in the image processor X2 determines for each of a plurality of functional blocks 2 to 4, 6, 7, 9 on whether an abnormality is occurring (presence/absence of abnormality) when the functional blocks are in "energized state" (S221).

Each functional block has a function of detecting the occurrence of an abnormality on the basis of detection results from various sensors and outputting a signal indicating the occurrence of abnormality to the NIC 5 upon detection of the abnormality. The MPU 53 of the NIC 5 thus determines on the presence/absence of an abnormality at each functional block depending on whether the functional block is outputting the signal indicating the occurrence of abnormality.

For example, the scanner unit 6 has a sensor that detects the intensity of light from a light source when the light source emitting light onto a manuscript is turned on. When the light intensity detected by the sensor is lower than a predetermined lowest intensity, the scanner unit 6 outputs a signal indicating the occurrence of abnormality to the NIC 5.

The printer unit 7 has a temperature sensor that detects the temperature of a heater for fixing by heat a toner image, which is transferred to a recording paper, to the recording paper. When a detected temperature of the heater does not go higher than a given temperature despite the continuation of the energized state of the heater for a given time or longer, the printer unit 7 outputs a signal indicating the occurrence of abnormality to the NIC 5.

<Step S222>

The MPU 53 of the NIC 5 generates the abnormality presence/absence data D32 on the basis of a determination result given at step S221 (S222).

Specifically, for the scan job, the MPU 53 generates the abnormality presence/absence data D32 that is set to indicate the presence of abnormality when one or more of the controlling unit 9, image process calculating unit 4, and scanner unit 6 shows an abnormality, and indicate the absence of abnormality otherwise.

For the print job, the MPU 53 generates the abnormality presence/absence data D32 that is set to indicate the presence of abnormality when one or more of the controlling unit 9, image process calculating unit 4, and printer unit 7 shows an abnormality, and indicate the absence of abnormality otherwise.

For the data filing job, the MPU 53 generates the abnormality presence/absence data D32 that is set to indicate the presence of abnormality when one or more of the controlling unit 9 and HDD 3 shows an abnormality, and indicate the absence of abnormality otherwise.

<Steps S223, S224>

The MPU 53 of the NIC 5 transmits the abnormality presence/absence data D32 generated at step S222 to the relay server Y1 (S223).

The MPU 53 of the NIC 5 then counts a preset time on the basis of a clock signal from the clock oscillator 53a (S224), and repeats the process at steps S221 to S223 every time the preset time has elapsed.

<Step S231>

Meanwhile, the relay server Y1 monitors to see if it has received the abnormality presence/absence data D32 from the image processor X2 (S231). Having received the abnormality presence/absence data D32, the relay server Y1 updates the abnormality presence/absence data D32 that has already been stored in the hard disc drive, etc., to the received abnormality presence/absence data D32 (S232). Afterward, the relay server Y1 repeats the process at steps S231, S232.

Execution of the process shown in FIG. 14 constantly updates the abnormality presence/absence data D32 referred to by the relay server Y1 to the latest one.

A job transfer process executed by the relay server Y1 will then be described with reference to a flowchart shown in FIG. 13. S201, S202—shown in the following description represent reference numerals denoting processes (steps). The process to be executed by the relay server Y1 is put into practice as the CPU built in the relay server Y1 runs a program stored in the memory unit, such as hard disc drive, also built in the relay server Y1.

<Steps S201 to S205>

At the start of the procedure, the relay server Y1 monitors to see if it has received a new job from a terminal 32 (S201).

Confirming the reception of the new job, the relay server Y1 determines on whether an abnormality has occurred at a functional block needed for execution of the new job on the basis of the abnormality presence/absence data D32 (S202).

When determining that the functional block necessary for execution of the new job shows the occurrence of the abnormality, the relay server Y1 sends a response, which tells the abnormal state of the image processor X2, back to the terminal 32 having transmitted the new job (S203), and returns to the process at step S201.

The relay server Y1 (server's CPU), therefore, does not transfer the new job to the image processor X2 when the abnormality is occurring at the functional block necessary for execution of the new job. This prevents a useless job transfer process.

When determining that the functional block necessary for execution of the new job shows no occurrence of the abnormality, the relay server Y1 checks to see whether it is engaged at the present point in communication for another job (job transfer in progress) (S204). When being engaged in communication for another job, the relay server Y1 sends a response (reply) of "BUSY information", which tells that the relay server Y1 cannot transfer the new job, back to the terminal 32 having transmitted the new job (S205).

<Step S206>

When the functional block necessary for execution of the new job shows no abnormality and the relay server Y1 is not engaged in communication for (transfer of) another job, the relay server Y1 reads the job/address linking data D31 out of the hard disc drive, etc., and identifies the address (IP address) of the transfer destination of the new job on the basis of the job/address linking data D31 (S206).

The CPU of the relay server Y1, therefore, identifies the address of the NIC 5 corresponding to the type of the new job (any one of the first NIC 5a to third NIC 5C) on the basis of the job/address linking data D31 (an example of the second job type/address linking data) when receiving the new job from the terminal 32 (an example of a transfer destination address identifying unit).

The CPU of the relay server Y1 reading out the job/address linking data D31 is an example of the second job type/address linking data obtaining unit.

<Steps S207, S211>

The relay server Y1 then checks to see if the job transfer destination NIC 5, which is identified at step S206, is engaged in communication involved in execution of another job (S207). For example, the relay server Y1 sends a given command indicating the start of transmission of a job to the NIC 5 of the image processor X2, and determines on whether the NIC 5 is engaged in communication depending on whether a response from the NIC 5 to the command is "BUSY information" or not.

Confirming that the job transfer destination NIC 5 is not engaged in communication, the relay server Y1 starts a process of transferring the new job to the job transfer destination NIC 5 while receiving the new job from the terminal 32 (S211), and returns to the above process at step S201. In other words, the CPU of the relay server Y1 transfers the new job from the terminal 32 to the address of the NIC 5 identified at step S206 (an example of a job transfer unit).

Thus, the new job transmitted from the terminal 32 to the relay server Y1 is transferred to the image processor X2, and is processed there.

<Steps S208 to S210>

When determining that the job transfer destination NIC is engaged in communication at step S207, the relay server Y1 causes the memory unit, such as hard disc drive, built in the relay server Y1 to store the new job as the relay server Y1 receives the new job from the terminal 32 (S208).

The relay server Y1 then checks to see if the job transfer destination NIC 5 is engaged in communication, as those at step S207, and repeats the check until confirming that the job transfer destination NIC 5 is not engaged in communication (S209).

Confirming that the job transfer destination NIC 5 is no longer communicating, the relay server Y1 starts the process of transferring the new job to the job transfer destination NIC 5 while reading out the new job that is stored in the hard disc, etc., at step S208 (S210), and returns to the above process at step S201.

Thus, the new job transmitted from the terminal 32 to the relay server Y1 is stored temporarily in the relay server Y1, and then is transferred to and processed at the image processor X2.

As described above, when the relay server Y1 is provided to be capable of communicating with the image processor X2 having the plurality of NICs 5, the relay server Y1 can serve as the fixed transmission destination of a job sent from each terminal 32 (regardless of the type of the job).

In addition, a new job sent from a terminal 32 is transferred to the NIC 5 that is preset for the type of the new job (any one of the first NIC 5a to third NIC 5c) on the basis of the job/address linking data D31.

Proving the relay server Y1 allows the avoidance of the arising of different types of jobs at the same NIC 5 of the image processor X2 at overlapping timing, and also the avoidance of the arising of the same type of jobs at different NICs of the image processor X2 at overlapping timing, as the avoidance of the same cases according to the first embodiment.

This allows the prevention of such an inefficient situation where a job standing by for execution occupies an NIC 5 to make impossible the reception of another job that can be processed using the NIC 5.

As a result, the image processor X2 prevents an inefficient situation where a plurality of jobs supposed to be processed concurrently in parallel processing cannot be processed concurrently, thus improves the image processor's job processing efficiency.

While the second embodiment described above offers an example of the system that arranges one relay server Y1 in correspondence to one image processor X2, another system may be provided, which arranges a plurality of relay servers Y1 in correspondence to one image processor X2. In this case, any one of the relay servers Y1 (relay server's NICs) is determined to be a job transmission destination at each of the plurality of terminals 32.

This reduces the frequency of overlapping transmission of jobs from the terminals 32 to the same single relay server Y1, that is, reduces the frequency of transmission of the "BUSY" information response from the relay server Y1 to the terminal 32 through the process at steps S204 and S205 shown in FIG. 13. This reduction in such a frequency allows the prevention, to the utmost extent, of an inefficient situation where a new job that can be subjected to parallel processing by the image processor X2 is not processed immediately because the relay server Y1 becomes a bottleneck to the processing. The same effect as described above can be achieved when the relay server Y1 is provided with a plurality of NICs and any one of the NICs incorporated in the relay server Y1 is determined to be a job transmission destination at each of the terminals 32.

The present invention is available for use in an image processor, etc.

The present invention allows an image processor having a plurality of communication units to avoid such an inefficient situation where a plurality of jobs supposed to be processed concurrently in parallel processing is not processed concurrently because of overlapping operation at a communication unit or occupation of a communication unit with a job waiting for processing. The present invention thus improves the image processor's job processing efficiency.

The invention claimed is:

1. An image processor comprising:
a plurality of communication units, each of the communication units comprising:
a priority job setting data obtaining unit that obtains priority job setting data, which sets types of priority jobs for each of the communication units, from a memory unit storing the priority job setting data;
a priority job controlling unit that carries out control so that a type of job set to be given priority in the priority job setting data is processed in priority when a plurality of jobs involving communication processes through the communication units arise at overlapping timing, the priority job controlling unit being located internal to its respective communication unit for controlling the respective communication unit; and
a job-linked address transmitting unit that when one of the communication units receives a type of a job from an external device, the job not being set to be given priority in the priority job setting data, transmits a communication address of another of the communication units to the external device, the another communication unit being set to give priority to the job in the priority job setting data, through the one of the communication units.

2. The image processor as defined in claim 1, wherein the priority job setting data is first job priority level setting data that sets priority levels of a plurality of types of jobs for each of the communication units, and wherein the priority job controlling unit carries out control so that a type of job set to be given a high priority level in the first job priority level setting data is processed in priority.

3. The image processor as defined in claim 1 or 2, comprising a first job type/address linking data transmitting unit that transmits first job type/address linking data to an external device via the communication unit, the first job type/address linking data representing a corresponding relation between a type of each job set to be given priority by each communication unit in the priority job setting data and a communication address of each communication unit.

4. The image processor as defined in claim 1 or 2, comprising a nonpriority print job reserving unit that when the communication unit receives a print job from an external device, the print job not being set to be given priority in the priority job setting data, causes a given memory unit to store the print job or image data based on the print job in a state of not being subjected to an image forming process based on the print job.

5. The image processor of claim 1 or 2, comprising:
an energization switching unit that makes switchover in separately energizing/deenergizing each of a plurality of functional blocks that is a component or an assembly of components divided according to each function; and
a functional block automatic starting unit that changes a deenergized state of a functional block into an energized state, when the functional block being deenergized state among the functional blocks necessary for execution of a job that is received by the communication unit from an external device, by controlling the energization switching unit.

6. An image processor having a plurality of communication units and a function of executing a plurality of jobs involving communication processes through the communication units, the image processor comprising:
a priority job setting data obtaining unit that obtains priority job setting data, which sets types of priority jobs for each of the communication units, from a memory unit storing the priority job setting data;
a priority job controlling unit that carries out control so that a type of job set to be given priority in the priority job setting data is processed in priority when a plurality of jobs involving communication processes through the communication units arise at overlapping timing; and
a job-linked address transmitting unit that when one of the communication units receives a type of a job from an external device, the job not being set to be given priority in the priority job setting data, transmits a communication address of another of the communication units to the external device, the another communication unit being set to give priority to the job in the priority job setting data, through the one of the communication units.

* * * * *